(12) United States Patent
Qiu et al.

(10) Patent No.: US 11,506,754 B2
(45) Date of Patent: Nov. 22, 2022

(54) RADAR BASED PATTERN CODE IDENTIFICATION

(71) Applicant: Samsung Electronics Co., Ltd., Suwon-si (KR)

(72) Inventors: Wenxun Qiu, Allen, TX (US); Vutha Va, Plano, TX (US); Kuldeep Gill, Richardson, TX (US); Boon Loong Ng, Plano, TX (US); Junsu Choi, Seoul (KR); Sungchul Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 177 days.

(21) Appl. No.: 16/946,350

(22) Filed: Jun. 17, 2020

(65) Prior Publication Data

US 2020/0400779 A1    Dec. 24, 2020

Related U.S. Application Data

(60) Provisional application No. 62/888,161, filed on Aug. 16, 2019, provisional application No. 62/863,604, filed on Jun. 19, 2019.

(51) Int. Cl.
*G01S 7/41*       (2006.01)
*G01S 7/295*      (2006.01)
(Continued)

(52) U.S. Cl.
CPC .............. *G01S 7/417* (2013.01); *G01S 7/295* (2013.01); *G01S 7/415* (2013.01); *G01S 13/103* (2013.01); *G01S 13/50* (2013.01)

(58) Field of Classification Search
None
See application file for complete search history.

(56) References Cited

U.S. PATENT DOCUMENTS

2008/0117094 A1    5/2008  Lindoff et al.
2012/0313808 A1   12/2012  Frohling
(Continued)

FOREIGN PATENT DOCUMENTS

DE    102014106890 A1    11/2015
EP        0372641 A2     6/1990
(Continued)

OTHER PUBLICATIONS

International Search Report dated Oct. 7, 2020 in connection with International Patent Application No. PCT/KR2020/007947, 3 pages.
(Continued)

*Primary Examiner* — Whitney Moore

(57) ABSTRACT

A method for close-range detection, includes transmitting, via a radar transceiver, radar signals to detect an object. The method also includes determining whether the object includes a pattern code based on reflections of the radar signals received by the radar transceiver. In response to determining that the object includes the pattern code, the method includes identifying range information about a range between the electronic device and the pattern code. The method further includes selecting, based on the range information, one or more signals from the reflections of the radar signals that are reflected off of the pattern code. Additionally, the method includes identifying, based on the one or more signals, information about the pattern code.

20 Claims, 25 Drawing Sheets

(51) Int. Cl.
*G01S 13/50* (2006.01)
*G01S 13/10* (2006.01)

(56) References Cited

U.S. PATENT DOCUMENTS

| 2015/0379314 | A1 | 12/2015 | Schreiber et al. |
| 2016/0042317 | A1* | 2/2016 | Goodman ........... G06Q 10/0833 |
| | | | 705/341 |
| 2017/0254898 | A1 | 9/2017 | Park et al. |
| 2018/0284262 | A1 | 10/2018 | Villano et al. |
| 2019/0220717 | A1* | 7/2019 | Shannon ............ G06K 19/0614 |
| 2019/0383902 | A1 | 12/2019 | Yeo et al. |

FOREIGN PATENT DOCUMENTS

| KR | 10-2013-0050410 A | 5/2013 |
| KR | 10-2017-0103115 A | 9/2017 |
| WO | 2018/046245 A1 | 3/2018 |

OTHER PUBLICATIONS

Written Opinion of the International Searching Authority dated Oct. 7, 2020 in connection with International Patent Application No. PCT/KR2020/007947, 5 pages.

Jun Yang, et al. "Efficient In-Pocket Detection with Mobile Phones", UbiComp'13, Session: Poster, Demo, & Video Presentations Sep. 8-12, 2013, Zurich, Switzerland, 4 pages.

Emiliano Miluzzo, et al. "Pocket, Bag, Hand, etc.—Automatically Detecting Phone Context through Discovery", First International Workshop on Sensing for App Phones (PhoneSense) at SenSys'10, 5 pages.

Rajkumar Darbar, et al. "SurfaceSense: Smartphone Can Recognize Where It Is Kept", IndiaHCI'15: Proceedings of the 7th International Conference on HCI, Dec. 2015, 8 pages.

Mayank Goel, et al. "GripSense: Using Built-In Sensors to Detect Hand Posture and Pressure on Commodity Mobile Phones", UIST'12, Oct. 7-10, 2012, 10 pages.

Zheng Yang, et al. ":Sherlock: Micro-environment Sensing for Smartphones", Transactions on Parallel and Distributed Systems, Dec. 2014, 11 pages.

Doruk Coskun, et al. "Phone Position/Placement Detection using Accelerometer: Impact on Activity Recognition", 2015 IEEE Tenth International Conference on Intelligent Sensors, Sensor Networks and Information Processing (ISSNIP), May 2015, 7 pages.

John J. Guiry, et al. "A Single vs. Multi-Sensor Approach to Enhanced Detection of Smartphone Placement", 2014 36th Annual International Conference of the IEEE Engineering in Medicine and Biology Society, Aug. 2014, 4 pages.

Khaled Alanezi, et al. "Impact of Smartphone Position on Sensor Values and Context Discovery", Computer Science Technical Reports, May 2013, 16 pages.

Valentin Radu, et al. "A Semi-Supervised Learning Approach for Robust Indoor-Outdoor Detection with Smartphones", SenSys'14, Nov. 3-6, 2014, Memphis, TN, USA. 15 pages.

Extended European Search Report dated Apr. 20, 2022 regarding Application No. 20827200.5, 8 pages.

* cited by examiner

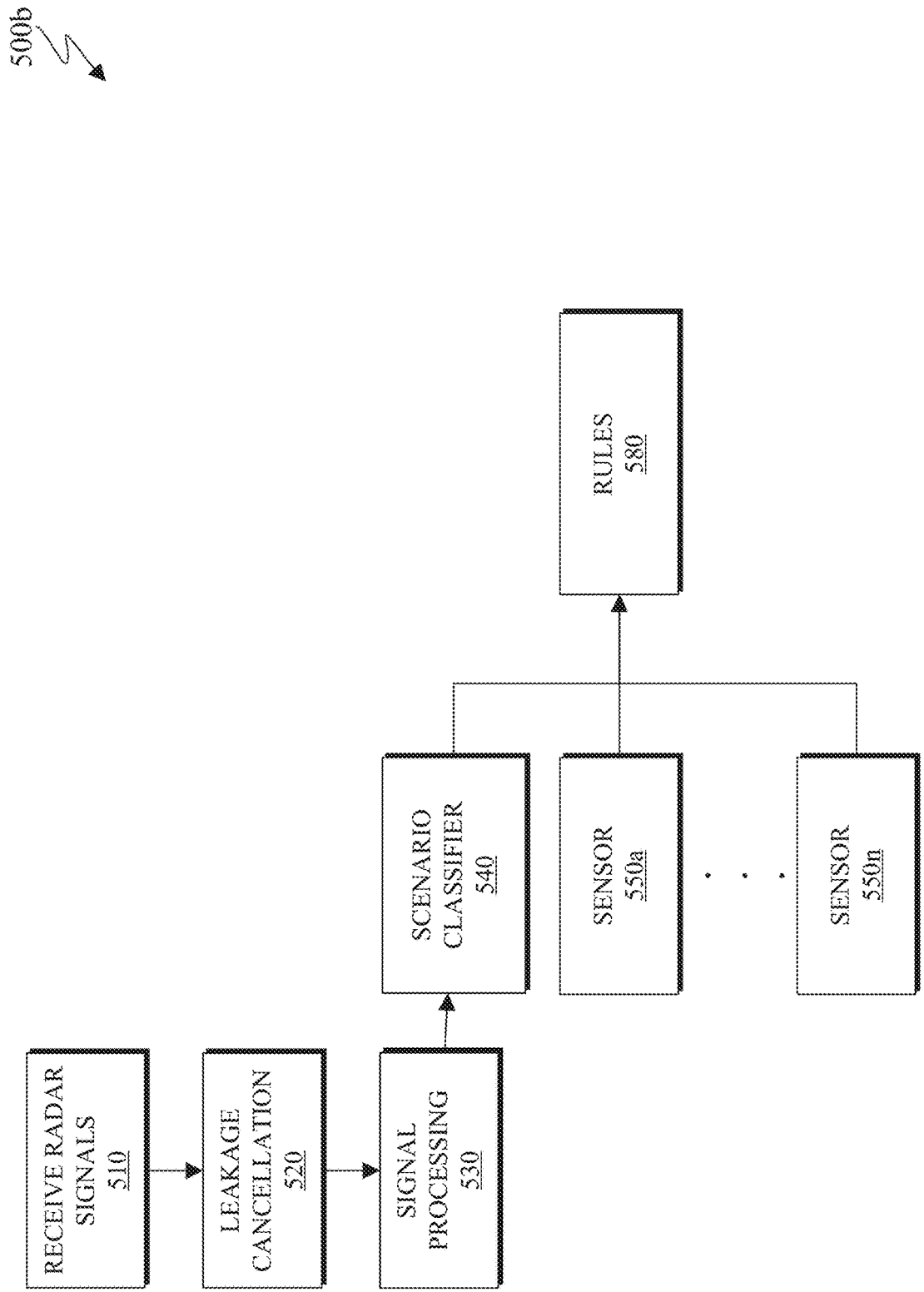

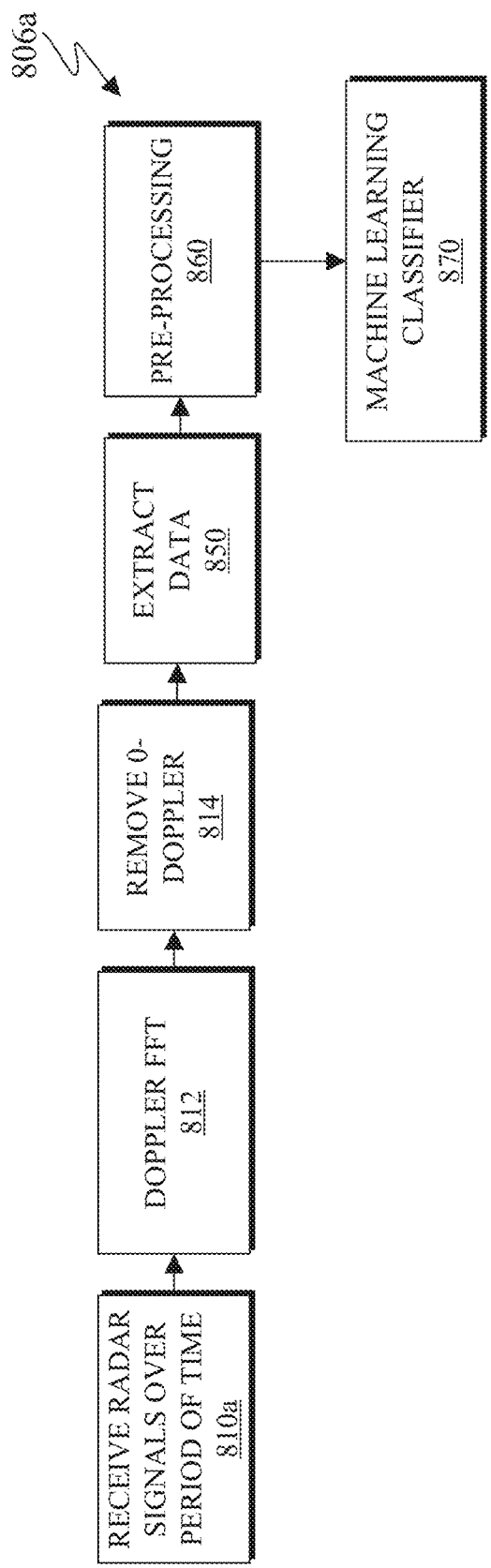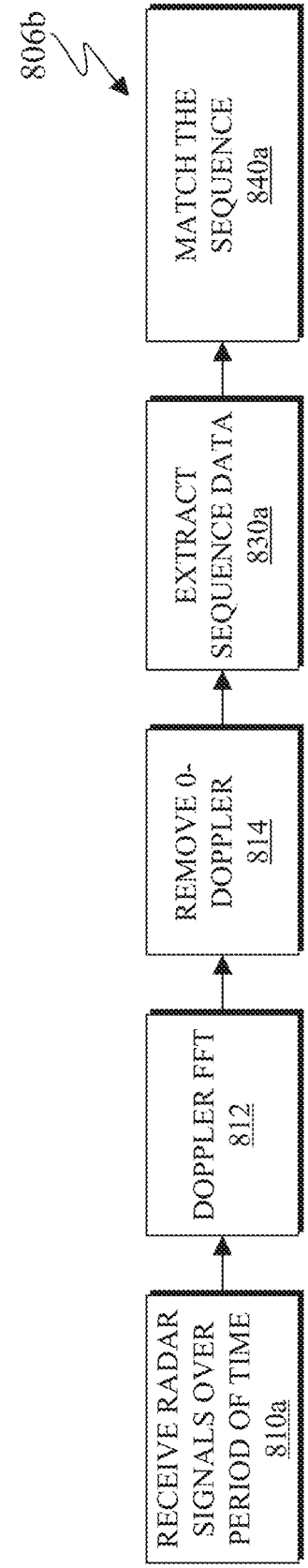
FIG. 8C
FIG. 8D

1111

0000

1110

1100

1011

| TABLE | |
|---|---|
| ▨ | BIT CONDUCTOR PRESENT |
| ☐ | BIT CONDUCTOR ABSENT |

RADAR BASED PATTERN CODE IDENTIFICATION

CROSS-REFERENCE TO RELATED APPLICATION AND CLAIM OF PRIORITY

This application claims priority under 35 U.S.C. § 119(e) to U.S. Provisional Patent Application No. 62/863,604 filed on Jun. 19, 2019 and U.S. Provisional Patent Application No. 62/888,161 filed on Aug. 16, 2019. The above-identified provisional patent applications are hereby incorporated by reference in its entirety.

TECHNICAL FIELD

This disclosure relates generally to radar based close-range detection. More specifically, this disclosure relates to detecting pattern codes and detecting the environment around an electronic device that transmits the radar signals.

BACKGROUND

The use of mobile computing technology such as a portable electronic device has greatly expanded largely due to usability, convenience, computing power, and the like. One result of the recent technological development is that electronic devices are becoming more compact, while the number of functions and features that a given device can perform is increasing. For example, certain electronic devices not only provide voice call services using a mobile communication network but can also offer radar capabilities. Radar can operate at various frequency bands including, but not limited to, 6-8 GHz, 28 GHz, 39 GHz, 60 GHz, and 77 GHz. Radar operates to localize targets in the radar field of view in terms of range and/or azimuth/elevation (angle) and/or velocity.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 5B illustrates an example flowchart for identifying the surrounding environment of an electronic device using radar and sensor data according to embodiments of this disclosure;

FIGS. 8C and 8D illustrate example flowcharts for identifying whether the cover of FIG. 8A is being closed using radar according to embodiments of this disclosure;

SUMMARY

Figure 1:
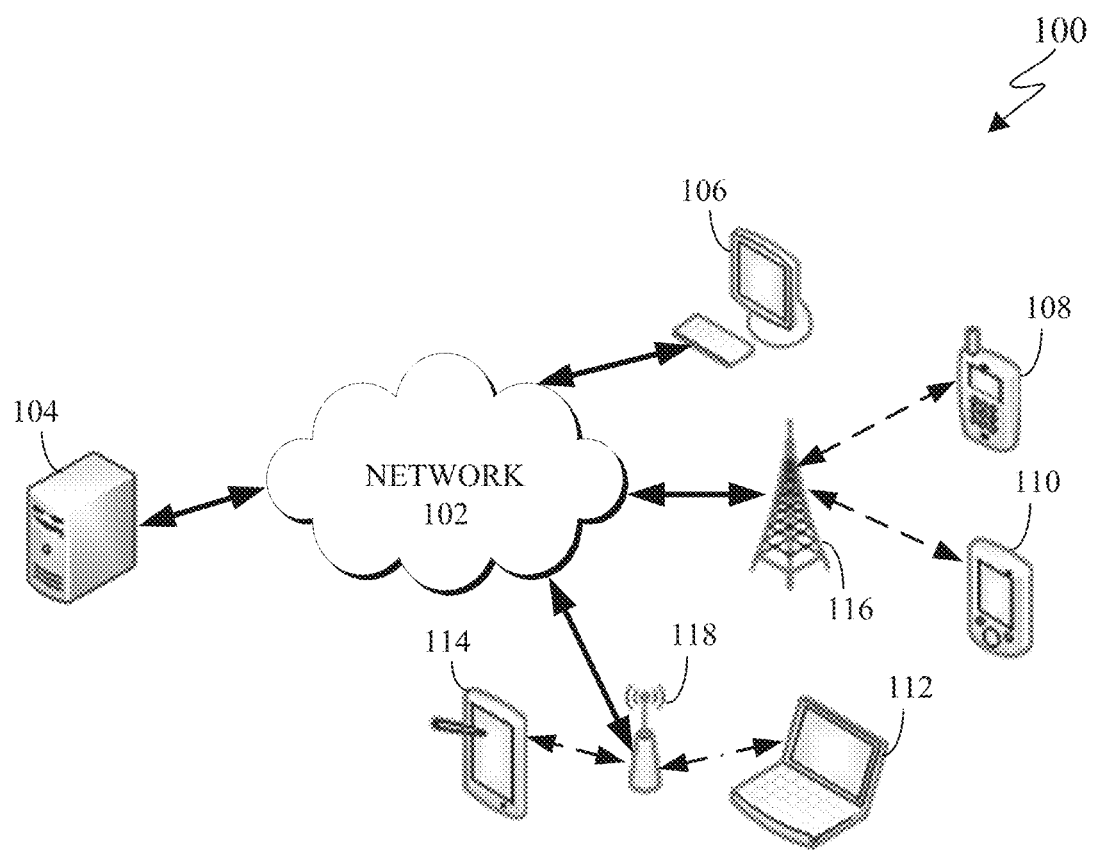
FIG. 1 illustrates an example communication system according to embodiments of this disclosure.

This disclosure provides radar-based pattern code identification.

In one embodiment, an electronic device for close-range detection is provided. The electronic device includes radar transceiver and a processor. The processor is configured to transmit, via the radar transceiver, radar signals to detect an object. The processor is also configured to determine whether the object includes a pattern code based on reflections of the radar signals received by the radar transceiver. In response to a determination that the object includes the pattern code, the processor is configured to identify range information about a range between the electronic device and the pattern code. The processor is further configured to select, based on the range information, one or more signals from the reflections of the radar signals that are reflected off of the pattern code. Additionally, the processor is configured to identify, based on the one or more signals, information about the pattern code.

In another embodiment, a method for close-range detection is provided. The method includes transmitting, via a radar transceiver, radar signals to detect an object. The method also includes determining whether the object includes a pattern code based on reflections of the radar signals received by the radar transceiver. In response to determining that the object includes the pattern code, the method includes identifying range information about a range between the electronic device and the pattern code. The method further includes selecting, based on the range information, one or more signals from the reflections of the radar signals that are reflected off of the pattern code. Additionally, the method includes identifying, based on the one or more signals, information about the pattern code.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

DETAILED DESCRIPTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

An electronic device, according to embodiments of the present disclosure, can include personal computers (such as a laptop, a desktop), a workstation, a server, a television, an appliance, and the like. In certain embodiments, an electronic device can be a portable electronic device such as a portable communication device (such as a smartphone or mobile phone), a laptop, a tablet, an electronic book reader (such as an e-reader), a personal digital assistants (PDAs), portable multimedia players (PMPs), MP3 players, mobile medical devices, virtual reality headsets, portable game consoles, cameras, and wearable devices, among others. Additionally, the electronic device can be at least one of a part of a piece of furniture or building/structure, an electronic board, an electronic signature receiving device, a projector, or a measurement device. The electronic device is one or a combination of the above-listed devices. Additionally, the electronic device as disclosed herein is not limited to the above-listed devices and can include new electronic devices depending on the development of technology. It is noted that as used herein, the term "user" may denote a human or another device (such as an artificial intelligent electronic device) using the electronic device. The electronic device as used herein can include a transceiver that can both transmit and receive radar signals.

Embodiments of the present disclosure provide systems and methods for close range radar detection using an electronic device, such as a smart phone. Close range radar detection can enable an electronic device to identify its own environment. The target of the radar signals is the environment that is around the electronic device. The environment can indicate where the electronic device, such as a smart phone, is located. For example, the radar-based device context detection can indicate whether the electronic device is held in a hand of a user, is in a pocket, is in a bag, located in a drawer (such as a desk drawer), and the like.

Close range radar detection also enables an electronic device to detect and extract information from a pattern code. A pattern code is similar to a barcode but is read by using a radar and composed of reflective strips. In certain embodiments, the reflective strips are metallic. For example, the pattern code can be embedded inside some materials (such as plastic, which is mostly transparent to the radar signal), and therefore not be visible. The pattern code can be encoded with information based on the spacing and widths of the strips. To read a pattern code, the electronic device transmits radar signals that are reflected off of the pattern code, which are used to decode and extract the encoded information.

Close range radar detection also enables an electronic device to determine whether a screen cover of a phone case is covering the phone. Similarly, close range radar detection also enables an electronic device to determine whether the screen cover of a phone case is in the process of covering the display or exposing the display of the electronic device.

For example, portable electronic device such as smartphones and tablets, often use protective cases with screen covers to protect the electronic device. Detecting if such a screen cover is on the screen provides context information for optimizing the device usage. For example, when the cover is on the screen, signifies that the user has intentionally stopped using the device and thus the screen can be turned off. However, if the user placed the electronic device in a pocket or in a bag while the protective cover is not covering the display screen, the display can accept unintentional inputs. A proximity sensor can detect whether the screen is covered. However based on the proximity sensor the electronic device is unable to distinguish between whether the screen is covered by the protective cover or another object (such as the hand of the user). For example, if the hand of a user covers the proximity sensor, the screen may turn off against the intentions of the user.

Portable electronic device such as smartphones and tablets, are often moved from one location to another. Embodiments, of the present disclosure provides systems and methods for detecting the environment around the electronic device. Based on the environment surrounding the electronic device, different functions of the electronic device can be activated, such as turning on/off the screen, changing the volume of a notification, changing the intensity of the vibrations, and the like. Embodiments of the present disclosure use radar with some designed structure embedded in the cover for applications such as the screen cover detection to determine whether the cover is covering the screen. Since this solution uses radar as the detection sensor, the dedicated sensor is no longer needed.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-114. The client devices 106-114 may be, for example, a smartphone, a tablet computer, a laptop, a personal computer, a wearable device, a head mounted display, or the like. The server 104 can represent one or more servers. Each server 104 includes any suitable computing or processing device that can provide computing services for one or more client devices, such as the client devices 106-114. Each server 104 could, for example, include one or more processing devices, one or more memories storing instructions and data, and one or more network interfaces facilitating communication over the network 102.

Each of the client devices 106-114 represent any suitable computing or processing device that interacts with at least one server (such as the server 104) or other computing device(s) over the network 102. The client devices 106-114 include a desktop computer 106, a mobile telephone or mobile device 108 (such as a smartphone), a PDA 110, a laptop computer 112, and a tablet computer 114. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. In certain embodiments, any of the client devices 106-114 can emit and collect radar signals via a radar transceiver.

In this example, some client devices 108 and 110-114 communicate indirectly with the network 102. For example, the mobile device 108 and PDA 110 communicate via one or more base stations 116, such as cellular base stations or eNodeBs (eNBs). Also, the laptop computer 112 and the tablet computer 114 communicate via one or more wireless access points 118, such as IEEE 802.11 wireless access points. Note that these are for illustration only and that each of the client devices 106-114 could communicate directly with the network 102 or indirectly with the network 102 via any suitable intermediate device(s) or network(s). In certain embodiments, any of the client devices 106-114 transmit information securely and efficiently to another device, such as, for example, the server 104

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
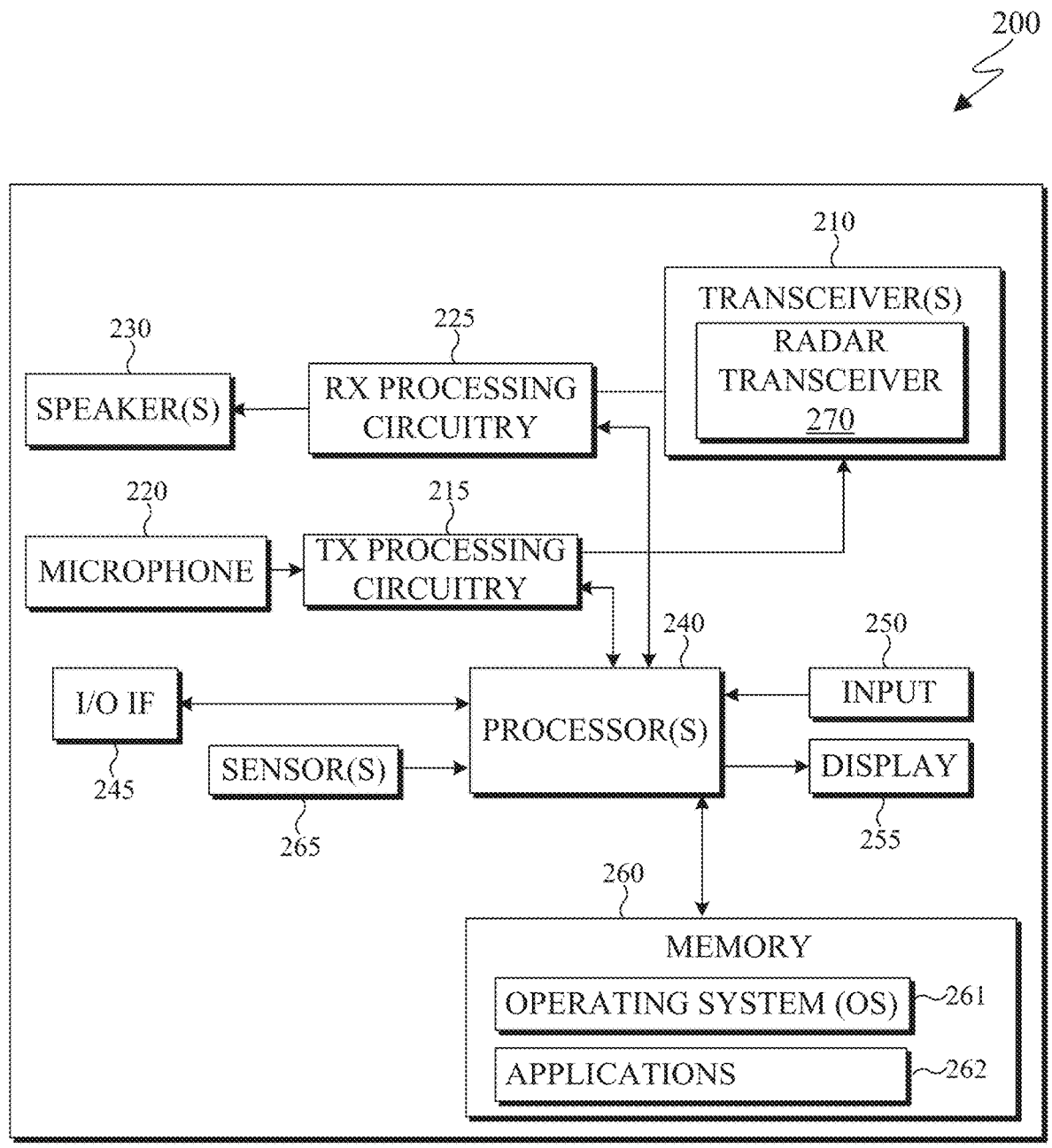
FIG. 2 illustrates an example electronic device according to embodiments of this disclosure.

FIG. 2 illustrates an example electronic device in accordance with an embodiment of this disclosure. In particular, FIG. 2 illustrates an example electronic device 200, and the electronic device 200 could represent the server 104 or one or more of the client devices 106-114 in FIG. 1. The electronic device 200 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, or the tablet computer 114 of FIG. 1), a robot, and the like.

As shown in FIG. 2, the electronic device 200 includes transceiver(s) 210, transmit (TX) processing circuitry 215, a microphone 220, and receive (RX) processing circuitry 225. The transceiver(s) 210 can include, for example, a RF transceiver, a BLUETOOTH transceiver, a WiFi transceiver, a ZIGBEE transceiver, an infrared transceiver, and various other wireless communication signals. The electronic device 200 also includes a speaker 230, a processor 240, an input/output (I/O) interface (IF) 245, an input 250, a display 255, a memory 260, and a sensor 265. The memory 260 includes an operating system (OS) 261, and one or more applications 262.

The transceiver(s) 210 can include an antenna array including numerous antennas. The antennas of the antenna array can include a radiating element composed of a conductive material or a conductive pattern formed in or on a substrate. The transceiver(s) 210 transmit and receive a signal or power to or from the electronic device 200. The transceiver(s) 210 receives an incoming signal transmitted from an access point (such as a base station, WiFi router, or BLUETOOTH device) or other device of the network 102 (such as a WiFi, BLUETOOTH, cellular, 5G, LTE, LTE-A, WiMAX, or any other type of wireless network). The transceiver(s) 210 down-converts the incoming RF signal to generate an intermediate frequency or baseband signal. The intermediate frequency or baseband signal is sent to the RX processing circuitry 225 that generates a processed baseband signal by filtering, decoding, and/or digitizing the baseband or intermediate frequency signal. The RX processing circuitry 225 transmits the processed baseband signal to the speaker 230 (such as for voice data) or to the processor 240 for further processing (such as for web browsing data).

The TX processing circuitry 215 receives analog or digital voice data from the microphone 220 or other outgoing baseband data from the processor 240. The outgoing baseband data can include web data, e-mail, or interactive video game data. The TX processing circuitry 215 encodes, multiplexes, and/or digitizes the outgoing baseband data to generate a processed baseband or intermediate frequency signal. The transceiver(s) 210 receives the outgoing processed baseband or intermediate frequency signal from the TX processing circuitry 215 and up-converts the baseband or intermediate frequency signal to a signal that is transmitted.

The processor 240 can include one or more processors or other processing devices. The processor 240 can execute instructions that are stored in the memory 260, such as the OS 261 in order to control the overall operation of the electronic device 200. For example, the processor 240 could control the reception of forward channel signals and the transmission of reverse channel signals by the transceiver(s) 210, the RX processing circuitry 225, and the TX processing circuitry 215 in accordance with well-known principles. The processor 240 can include any suitable number(s) and type(s) of processors or other devices in any suitable arrangement. For example, in certain embodiments, the processor 240 includes at least one microprocessor or microcontroller. Example types of processor 240 include microprocessors, microcontrollers, digital signal processors, field programmable gate arrays, application specific integrated circuits, and discrete circuitry. In certain embodiments, the processor 240 can include a neural network.

The processor 240 is also capable of executing other processes and programs resident in the memory 260, such as operations that receive and store data. The processor 240 can move data into or out of the memory 260 as required by an executing process. In certain embodiments, the processor 240 is configured to execute the one or more applications 262 based on the OS 261 or in response to signals received from external source(s) or an operator. Example, applications 262 can include a multimedia player (such as a music player or a video player), a phone calling application, a virtual personal assistant, and the like.

The processor 240 is also coupled to the I/O interface 245 that provides the electronic device 200 with the ability to connect to other devices, such as client devices 106-114. The I/O interface 245 is the communication path between these accessories and the processor 240.

The processor 240 is also coupled to the input 250 and the display 255. The operator of the electronic device 200 can use the input 250 to enter data or inputs into the electronic device 200. The input 250 can be a keyboard, touchscreen, mouse, track ball, voice input, or other device capable of acting as a user interface to allow a user in interact with the electronic device 200. For example, the input 250 can include voice recognition processing, thereby allowing a user to input a voice command. In another example, the input 250 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 250 can be associated with the sensor(s) 265, the radar transceiver 270, a camera, and the like, which provide additional inputs to the processor 240. The input 250 can also include a control circuit. In the capacitive scheme, the input 250 can recognize touch or proximity.

The display 255 can be a liquid crystal display (LCD), light-emitting diode (LED) display, organic LED (OLED), active matrix OLED (AMOLED), or other display capable of rendering text and/or graphics, such as from websites, videos, games, images, and the like. The display 255 can be a singular display screen or multiple display screens capable of creating a stereoscopic display. In certain embodiments, the display 255 is a heads-up display (HUD).

The memory 260 is coupled to the processor 240. Part of the memory 260 could include a RAM, and another part of the memory 260 could include a Flash memory or other ROM. The memory 260 can include persistent storage (not shown) that represents any structure(s) capable of storing and facilitating retrieval of information (such as data, program code, and/or other suitable information). The memory 260 can contain one or more components or devices supporting longer-term storage of data, such as a read only memory, hard drive, Flash memory, or optical disc.

The electronic device 200 further includes one or more sensors 265 that can meter a physical quantity or detect an activation state of the electronic device 200 and convert metered or detected information into an electrical signal. For example, the sensor 265 can include one or more buttons for touch input, a camera, a gesture sensor, optical sensors, cameras, one or more inertial measurement units (IMUs), such as a gyroscope or gyro sensor, and an accelerometer. The sensor 265 can also include an air pressure sensor, a magnetic sensor or magnetometer, a grip sensor, a proximity sensor, an ambient light sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 265 can further include control circuits for controlling any of the sensors included therein. Any of these sensor(s) 265 may be located within the electronic device 200 or within a secondary device operably connected to the electronic device 200.

In this embodiment, one of the one or more transceivers in the transceiver 210 is a radar transceiver 270 that is configured to transmit and receive signals for detecting and ranging purposes. For example, the radar transceiver 270 may be any type of transceiver including, but not limited to a WiFi transceiver, for example, an 802.11ay transceiver. The radar transceiver 270 can operate both radar and communication signals concurrently. The radar transceiver 270 includes one or more antenna arrays, or antenna pairs, that each includes a transmitter (or transmitter antenna) and a receiver (or receiver antenna 159). The radar transceiver 270 can transmit signals at a various frequencies For example, the radar transceiver 270 can transmit signals at frequencies including, but not limited to, 6 GHz, 7 GHz, 8 GHz, 28 GHz, 39 GHz, 60 GHz, and 77 GHz. In some embodiments, the signals transmitted by the radar transceiver 270 can include, but are not limited to, millimeter wave (mmWave) signals. The radar transceiver 270 can receive the signals, which were originally transmitted from the radar transceiver 270, after the signals have bounced or reflected off of target objects in the surrounding environment of the electronic device 200.

Figure 3A:
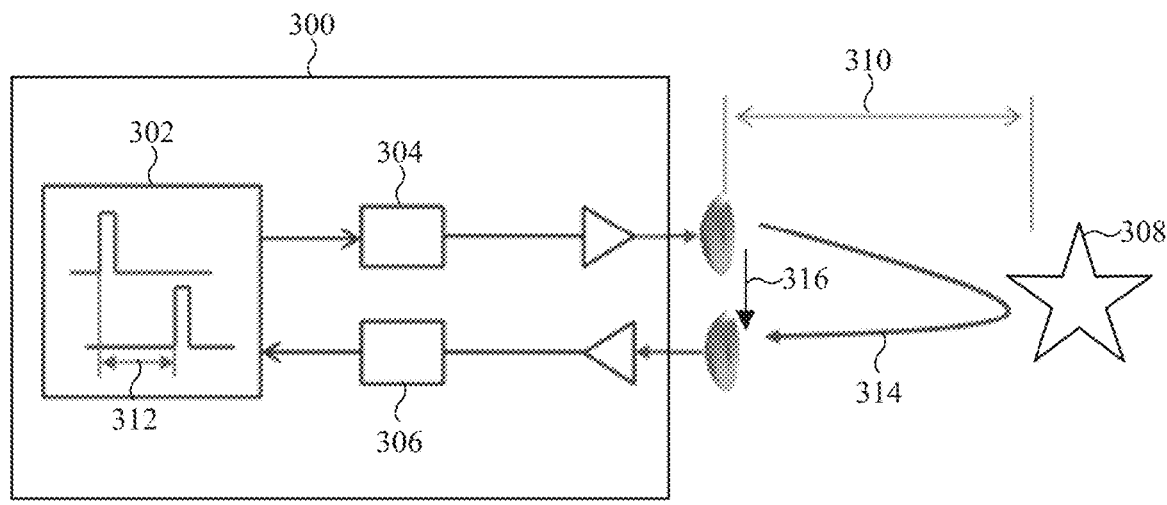
FIG. 3A illustrates an example architecture of a monostatic radar signal according to embodiments of this disclosure.

In certain embodiments, the radar transceiver 270 is a monostatic radar as the transmitter of the radar signal and the receiver, for the delayed echo, are positioned at the same or similar location. For example, the transmitter and the receiver can use the same antenna or nearly-co-located while using separate, but adjacent antennas. Monostatic radars are assumed coherent, i.e. transmitter and receiver are synchronized via a common time reference. FIG. 3A, below, illustrates an example monostatic radar.

In certain embodiments, the radar transceiver 270 can include a transmitter and a receiver. The transmitter can transmit millimeter wave (mmWave) signals. The receiver can receive the mmWave signals originally transmitted from the transmitter after the mmWave signals have bounced or reflected off of target objects in the surrounding environment of the electronic device 200. The processor 240 can analyze the time difference between when the mmWave signals are transmitted and received to measure the distance of the target objects from the electronic device 200. Based on the time differences, the processor 240 can generate an image of the objection by mapping the various distances.

Although FIG. 2 illustrates one example of electronic device 200, various changes can be made to FIG. 2. For example, various components in FIG. 2 can be combined, further subdivided, or omitted and additional components can be added according to particular needs. As a particular example, the processor 240 can be divided into multiple processors, such as one or more central processing units (CPUs), one or more graphics processing units (GPUs), one or more neural networks, and the like. Also, while FIG. 2 illustrates the electronic device 200 configured as a mobile telephone, tablet, or smartphone, the electronic device 200 can be configured to operate as other types of mobile or stationary devices.

Figure 3B:
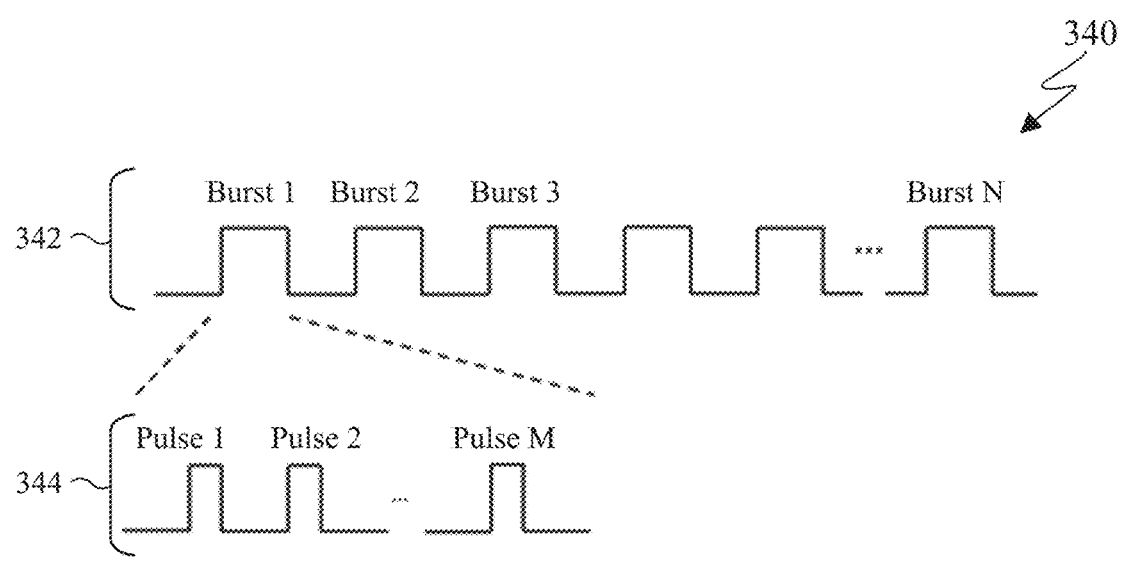
FIG. 3B illustrates an example frame structure according to embodiments of this disclosure.
Figure 3C:
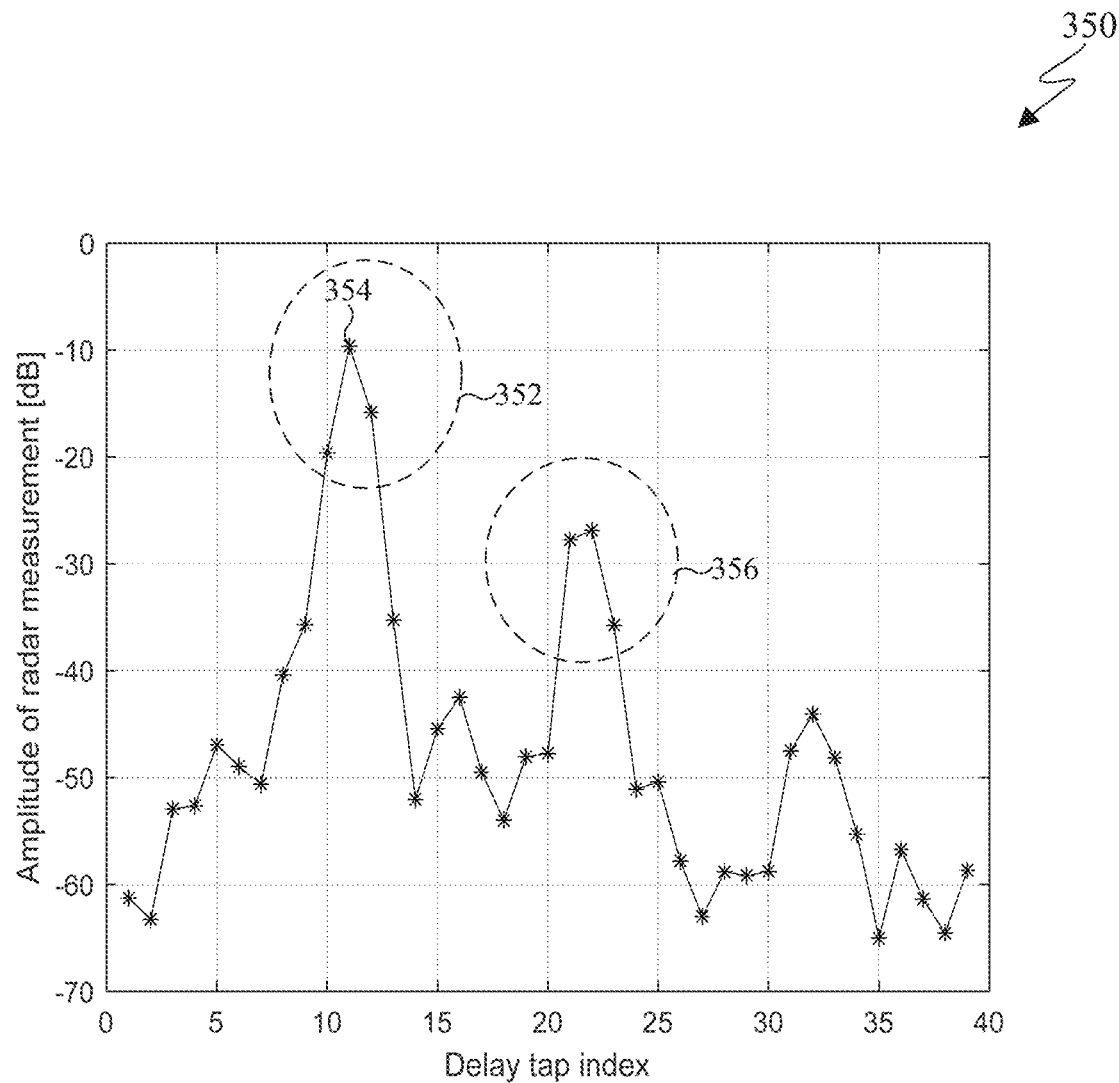
FIG. 3C illustrates an example graph for measuring leakage according to embodiments of this disclosure.

FIG. 3A illustrates an example architecture of a monostatic radar in accordance with an embodiment of this disclosure. FIG. 3B illustrates an example frame structure 340 in accordance with an embodiment of this disclosure. FIG. 3C illustrates an example graph 350 for measuring leakage according to embodiments of this disclosure. The embodiments of FIGS. 3A, 3B, and 3C are for illustration only and other embodiments can be used without departing from the scope of the present disclosure.

FIG. 3A illustrates an electronic device 300 that includes a processor 302, a transmitter 304, and a receiver 306. The electronic device 300 can be similar to any of the client devices 106-114 of FIG. 1, the server 104 of FIG. 1, or the electronic device 200 of FIG. 2. The processor 302 is similar to the processor 240 of FIG. 2. Additionally, the transmitter 304 and the receiver 306 can be included within the radar transceiver 270 of FIG. 2.

The transmitter 304 transmits a signal 314 to the target object 308. The target object 308 is located a distance 310 from the electronic device 300. In certain embodiments, the target object 308 of FIG. 3A is a pattern code. In certain embodiments, the target object 308 correspond to the objects that form the environment around the electronic device 300. For example, the transmitter 304 transmits a signal 314 via an antenna. The signal 314 is reflected off of the target object 308 and received by the receiver 306, via an antenna. The signal 314 represents one or many signals that can be transmitted from the transmitter 304 and reflected off of the target object 308. The processor 302 can identify the information associated with the target object 308 based on the receiver 306 receiving the multiple reflections of the signals.

Leakage 316 represents radar signals that are transmitted from the antenna associated with transmitter 304 and are directly received by the antenna associated with the receiver 306 without being reflected off of the target object 308. Detection or range estimation is challenging and can be compromised due to the presence of the leakage 316. For example, the leakage 316 creates difficulty for close range radar detection, as the leakage 316 could mask the target object 308 which the electronic device 300 is attempting to identify. Measuring the leakage 316 can be represented by a CIR as described in more detail in FIG. 3C, below.

In order to identify the environment or the pattern code, the processor 302 analyzes a time difference 312 from when the signal 314 is transmitted by the transmitter 304 and received by the receiver 306. It is noted that the time difference 312 is also referred to as a delay, as it indicates a delay between the transmitter 304 transmitting the signal 314 and the receiver 306 receiving the signal after the signal is reflected or bounced off of the target object 308. Based on the time difference 312, the processor 302 derives the distance 310 between the electronic device 300, and the target object 308. It is noted that the distance 310 can change such as when the target object 308 moves, while electronic device 300 is stationary, the electronic device 300 moves while the target object 308 is stationary, or both the electronic device 300 and the target object 308 are both moving.

Monostatic radar is characterized for its delayed echo as the transmitter 304 of the radar signal and the receiver 306 of the radar signal essentially at the same location. In certain embodiments, the transmitter 304 and the receiver 306 are co-located either by using a common antenna or nearly co-located but use separate but adjacent antennas. Monostatic radars are assumed coherent such that the transmitter 304 and the receiver 306 are synchronized via a common time reference Pulse radar is generated as a realization of a desired radar waveform, modulated onto a radio carrier frequency, and transmitted through a power amplifier and antenna, such as a parabolic antenna. In certain embodiments, the antenna is omnidirectional. In other embodiments, the antenna is focused into a particular direction. When the target object 308 is within the field of view of the transmitted signal and within a distance 310 from the radar location, then the target object 308 will be illuminated by RF power density (W/m²), $p_t$, for the duration of the transmission. Equation (1) describes the first order of the power density, $p_t$.

$$p_t = \frac{P_T}{4\pi R^2} G_T = \frac{P_T}{4\pi R^2} \frac{A_T}{(\lambda^2/4\pi)} = P_T \frac{A_T}{\lambda^2 R^2} \qquad \text{Equation (1)}$$

Referring to Equation (1), $P_T$ is the transmit power (W). $G_T$ describes the transmit antenna gain (dBi) and $A_T$ is an effective aperture area (m²). $\lambda$ corresponds to the wavelength of the radar signal RF carrier signal (m), and R corresponds to the distance 310 between the antenna and the target object 308. In certain embodiments, effects of atmospheric attenuation, multi-path propagation, antenna loss and the like are negligible, and therefore not addressed in Equation (1).

The transmit power density impinging onto the target object 308 surface can cause reflections depending on the material, composition, surface shape and dielectric behavior at the frequency of the radar signal. In certain embodiments, only direct reflections contribute to a detectable receive signal since off-direction scattered signals can be too weak to be received by at the radar receiver. The illuminated areas of the target with normal vectors pointing back at the receiver can act as transmit antenna apertures with directives (gains) in accordance with their effective aperture areas. Equation (2), below, describes the reflective back power.

$$P_{refl} = p_t A_t G_t \sim p_t A_t r_t \frac{A_t}{\lambda^2/4\pi} = p_t RSC \quad \text{Equation (2)}$$

In Equation (2), $P_{refl}$ describes the effective isotropic target-reflected power (W). The term, $A_t$ describes the effective target area normal to the radar direction (m²). The term $r_t$ describes the reflectivity of the material and shape, which can range from [0, . . . , 1]. The term $g_t$ describes the corresponding aperture gain (dBi). RSC is the radar cross section (m²) and is an equivalent area that scales proportional to the actual reflecting area-squared inversely proportional with the wavelength-squared and is reduced by various shape factors and the reflectivity of the material itself. Due to the material and shape dependency, it is difficult to deduce the actual physical area of a target from the reflected power, even if the distance 310 to the target object 308 is known.

The target reflected power at the receiver location results from the reflected power density at the reverse distance 310 collected over the receiver antenna aperture area. Equation (3), below, describes the received target reflected power. It is noted that $P_R$ is the received target reflected power (W) and $A_R$ is the receiver antenna effective aperture area (m²). In certain embodiments, $A_R$ is the same as $A_r$.

$$P_R = \frac{P_{refl}}{4\pi R^2} A_R = P_T \cdot RSC \frac{A_T A_R}{4\pi \lambda^2 R^4} \quad \text{Equation (3)}$$

A radar system can be used as long as the receiver signal exhibits sufficient signal-to-noise ratio (SNR). The value of SNR depends on the waveform and detection method. Equation (4), below, describes the SNR. It is noted that kT is the Boltzmann constant multiplied by the current temperature. B is the radar signal bandwidth (Hz). F is the receiver noise factor which is a degradation of the receive signal SNR due to noise contributions of the receiver circuit itself.

$$SNR = \frac{P_R}{kT \cdot B \cdot F} \quad \text{Equation (4)}$$

When the radar signal is a short pulse of duration or width, $T_p$, the delay or time difference 312 between the transmission and reception of the corresponding echo is described in Equation (5). τ corresponds to the delay between the transmission and reception of the corresponding echo and equal to Equation (5). c is the speed of light propagation in the air. When there are multiple targets at different distances, individual echoes can be distinguished only if the delays differ by at least one pulse width. As such, the range resolution of the radar is described in Equation (6). A rectangular pulse of a duration $T_P$ exhibits a power spectral density as described in Equation (7) and includes a first null at its bandwidth as shown in Equation (8). The range resolution of a radar signal is connected with the bandwidth of the radar waveform is expressed in Equation (9).

$$\tau = 2R/c \quad \text{Equation (5)}$$

$$\Delta R = c\Delta\tau/2 = cT_P/2 \quad \text{Equation (6)}$$

$$P(f) \sim (\sin(\pi f T_p)/(\pi f T_p))^2 \quad \text{Equation (7)}$$

$$B = 1/T_P \quad \text{Equation (8)}$$

$$\Delta R = c/2B \quad \text{Equation (9)}$$

Depending on the radar type, various forms of radar signals exist. One example is a Channel Impulse Response (CIR). CIR measures the reflected signals (echoes) from potential targets as a function of distance at the receive antenna module, such as the radar transceiver 270 of FIG. 2. In certain embodiments, CIR measurements are collected from transmitter and receiver antenna configurations which when combined can produce a multidimensional image of the surrounding environment. The different dimensions can include the azimuth, elevation, range, and Doppler.

The example frame structure 340 of FIG. 3B illustrates an example raw radar measurement based on a pulse compression radar. The frame structure 340 describes that time is divided into frames, where a frame is further divided into bursts 342, and several pulses 344 can be transmitted by the radar transmitter in each burst 342. For example, the example frame structure 340 includes burst 1, burst 2, burst 3, through bust N. Each bust includes multiple pulses 344, such as pulse 1, pulse 2 through pulse M. In certain embodiments, different transmit and receive antenna configurations activate for each pulse or each burst. In certain embodiments, different transmit or receive antenna configurations activate for each pulse or each burst. It is noted that although the example frame structure 340 illustrates only one burst type, multiple burst types can be defined in the same frame, where each burst type includes a different antenna configuration.

In certain embodiments, each pulse or burst may have a different transmit/receive antenna configuration corresponding to the active set of antenna elements and corresponding beamforming weights. For example, each of the M pulses in a burst has a different transmit and receive antenna pair, and each of the bursts 342 all repeat the same pulses. As such, all of the signals from all the pulses within a burst provide a complete scan of the radar field of view, and the repetitions across the bursts provide a way to capture the temporal variation. The temporal variation can be considered Doppler information. The example frame structure 340 illustrates uniform spacing between pulses and bursts. In certain embodiments, any the spacing, even non-uniform spacing, between pulses and bursts can be used.

An example radar measurement may be a three-dimensional (3D) CIR matrix. The first dimension corresponds to the burst index, the second dimension corresponds to the pulse index, and the third dimension corresponds to the delay tap index. The delay tap index can be translated to the measurement of range or equivalently the flight time of the received signal (the time duration between transmitting and receiving the signal).

The example graph 350 of FIG. 3C depicts a CIR depicting a measured leakage response. The CIR is a response metric based on the signals received by the receiver 306. For example, the CIR is a measure of amplitude and/or phase of a reflected signal as a function of distance. As shown in the graph 350 the CIR is depicted with the delay tap index denoted on the x-axis, measuring the distance, and the amplitude of the radar measurement [dB] denoted on the y-axis. Monostatic radar, such as illustrated in graph 350, has separate transmitting and receiving antenna modules, a strong signal can radiate directly from the transmitter 304 to the receiver 306 causing a strong response at the delay corresponding to the separation between the transmitter 304 and receiver 306. The strong signal radiating from the transmitter 304 to the receiver 306 is referred to as a leakage signal. Even if the direct leakage signal from the transmitter 304 can be assumed to correspond to a single delay, the effect of the direct leakage signal can still impact multiple delay taps adjacent to the direct leakage signal.

In the measured leakage response illustrated by the graph 350, the main leakage peak 352 is denoted at tap 354 (the $11^{th}$ tap). In addition, taps 10 and 12 also have strong responses, noted by the responses being greater than 20 dB above the noise floor. Because of the additional responses such as shown at taps 10 and 12, it is difficult to reliably detect and estimate the target range within those first few taps from the leakage taps. The graph 350 also illustrates a second leakage 356.

Although FIGS. 3A, 3B, and 3C illustrate electronic device 300 and radar signals various changes can be made to FIGS. 3A, 3B, and 3C. For example, different antenna configurations can be activated. FIGS. 3A, 3B, and 3C do not limit this disclosure to any particular radar system or apparatus.

FIGS. 4A-4F describe embodiments of the present disclosure for using radar signals to identify the surrounding environment of the electronic device, while FIGS. 5A-5E describe embodiments of the present disclosure for using both radar signals and data from sensors of the electronic device to identify information about the surrounding environment of the electronic device. That is, FIGS. 4A-5E illustrate different methods for an electronic device to identify information about the surrounding environment of the electronic device. Various changes can be made to FIGS. 4A-5E. For example, while various embodiments are shown as a series of steps, various steps could overlap, occur in parallel, or occur multiple times.

Based on the transmitted and received radar signals (or a combination of the radar signals and sensor data) the electronic device (such as the electronic device 200 or the electronic device 300) identifies information about the environment around the electronic device. For example, detected environment information, such as the radar signals or a combination of the radar signals and sensor data, can indicate the placement of the electronic device. The placement of the electronic device includes whether the electronic device is being held by a hand of a user, located within a pocket, located on a table, and the like. The detected environment information, such as the radar signals or a combination of the radar signals and sensor data, can also indicate information about the object that is near the electronic device. The information about the object can include the material of the object, the shape of the object, the size of the object, and the position of the object. The detected environment information, such as the radar signals or a combination of the radar signals and sensor data, can also indicate information about whether the electronic device is within an encloser. The information about the enclosure can indicate when the electronic device is fully covered within a case, when the electronic device is in a bag, when the electronic device is in a drawer, when the electronic device is in a pocket, when another object covering part of the device, and the like.

Figure 4A:
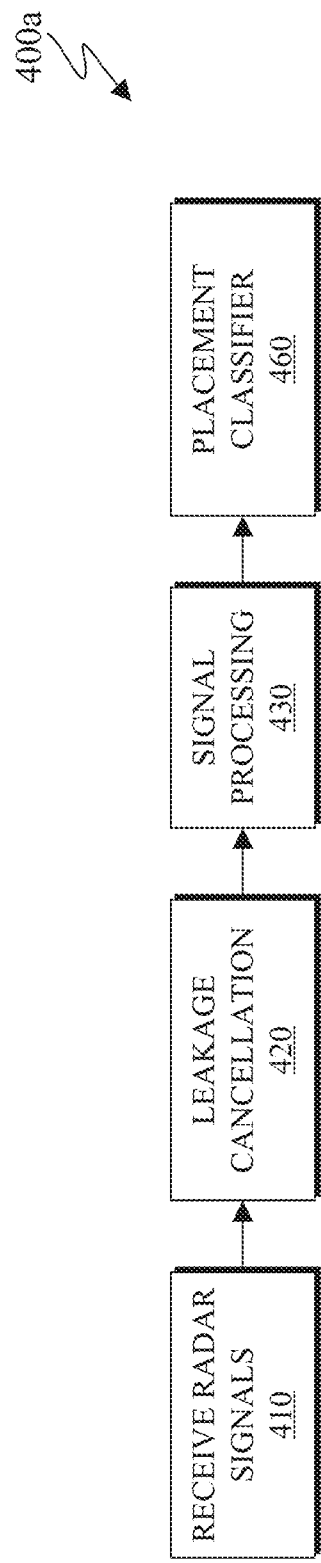
FIG. 4A illustrates an example flowchart for identifying the surrounding environment of an electronic device using radar according to embodiments of this disclosure.
Figure 4B:
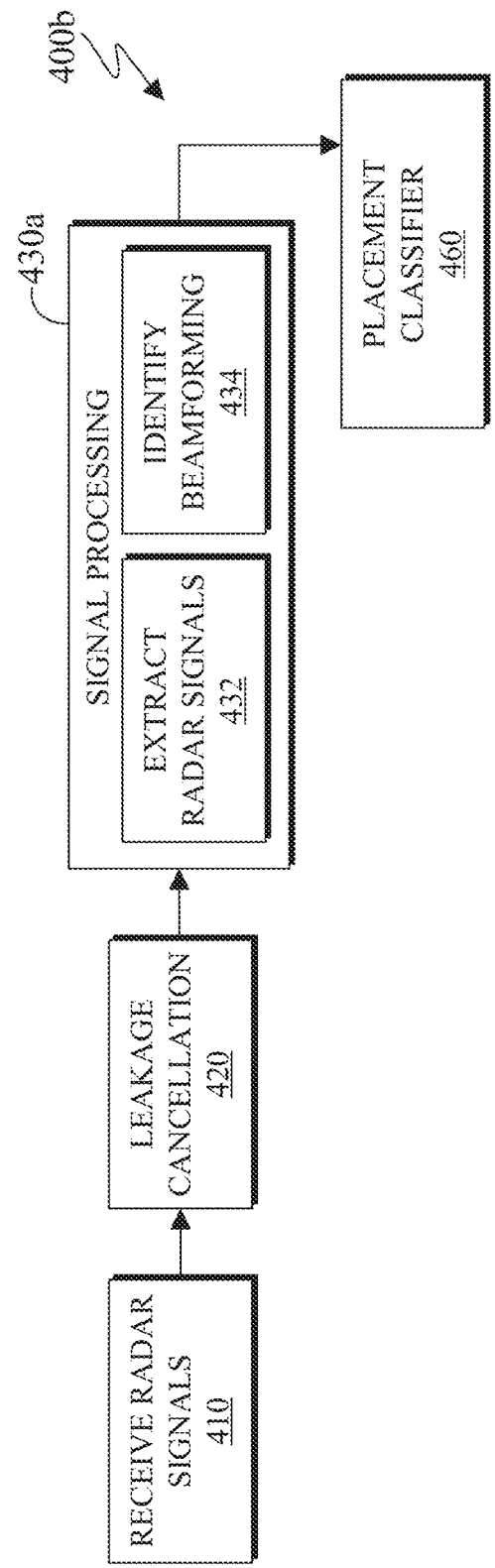
FIGS. 4B, 4C, and 4D illustrate examples for signal processing according to embodiments of this disclosure.
Figure 4C:
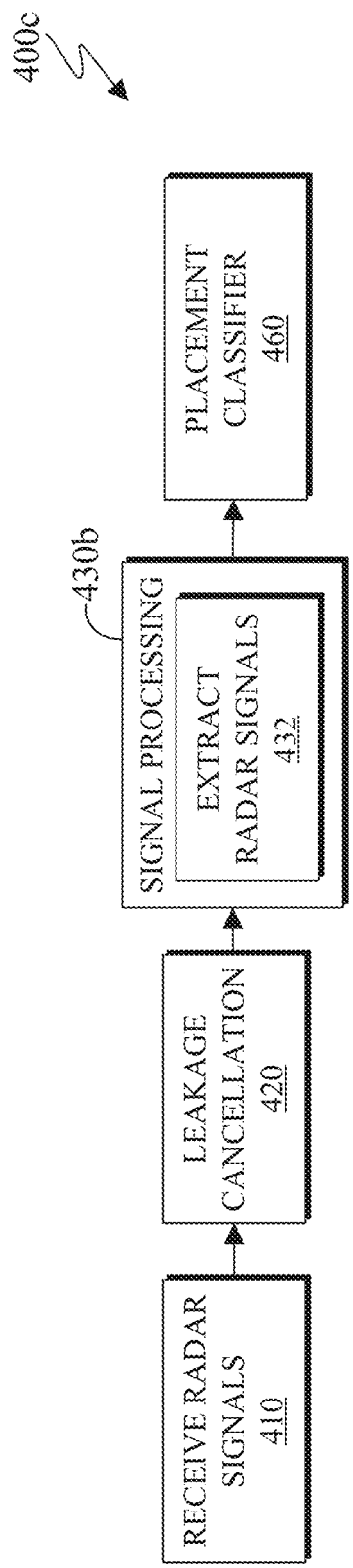
Figure 4D:
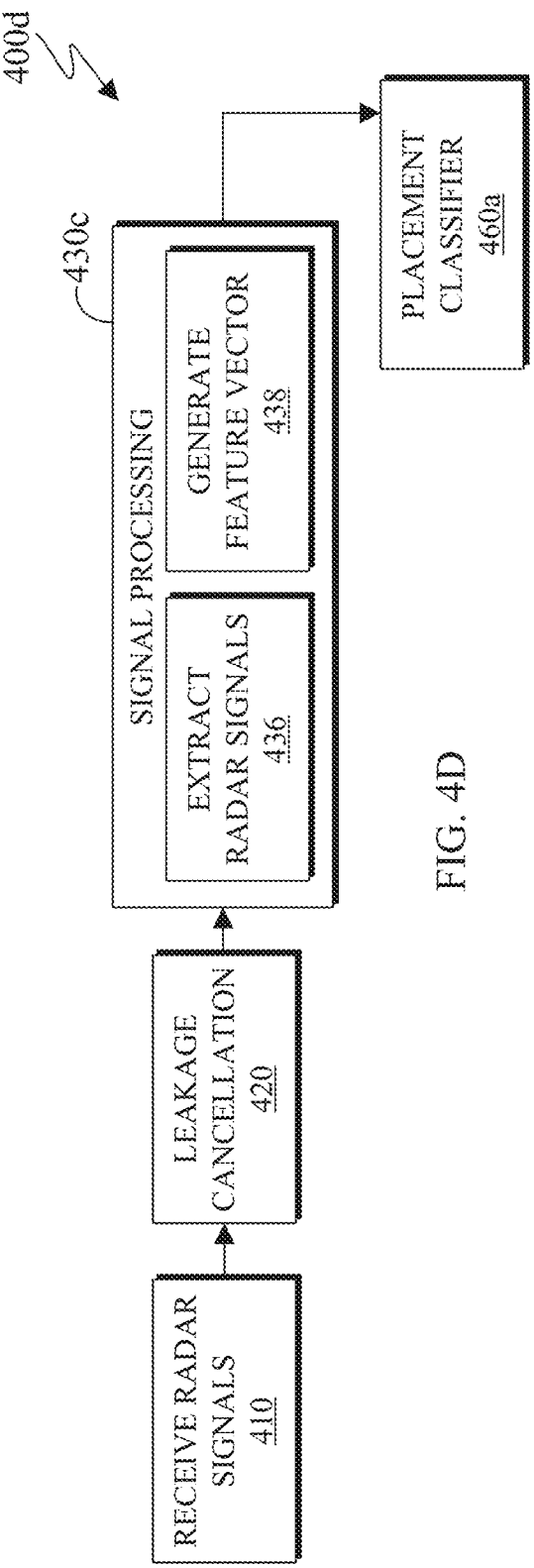
Figure 4E:
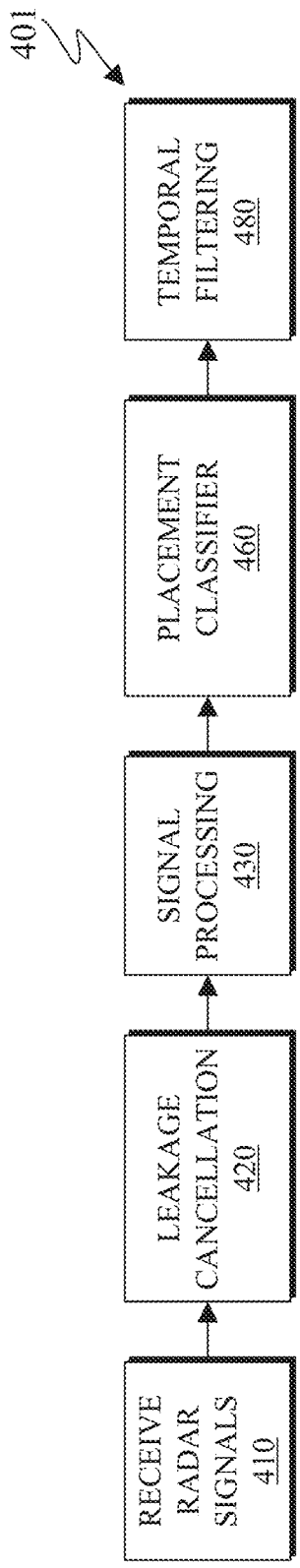
FIGS. 4E and 4F illustrate example flowcharts for identifying the surrounding environment of an electronic device using radar according to embodiments of this disclosure.
Figure 4F:
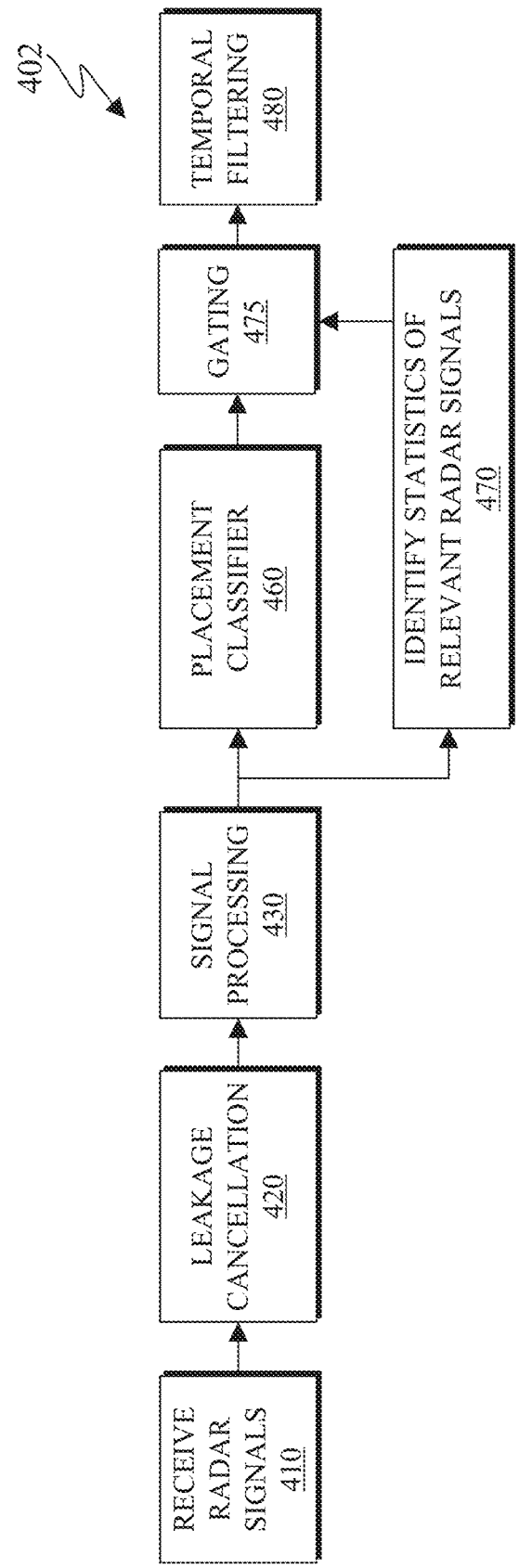
Figure 4G:
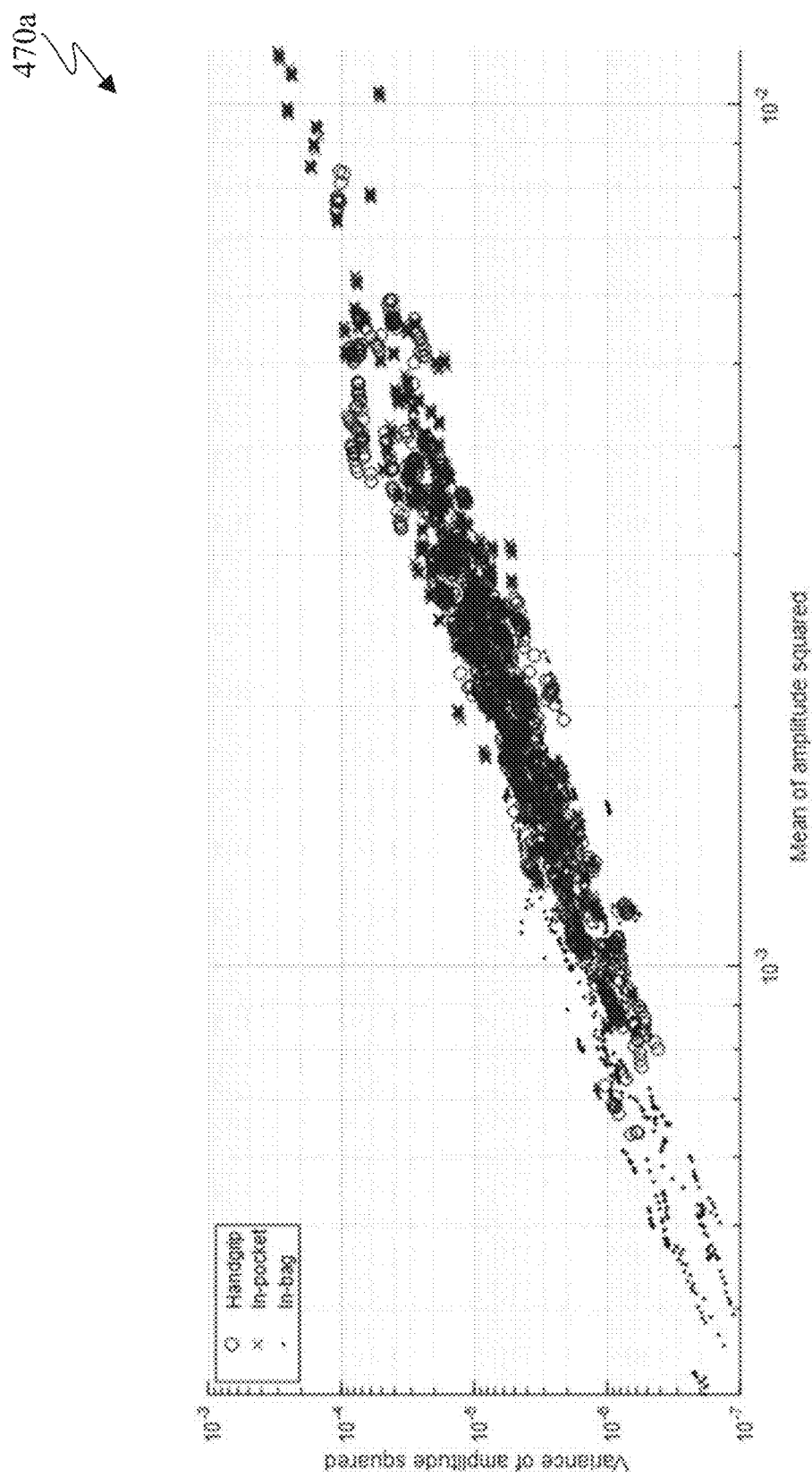
FIG. 4G illustrates an example graph for identifying the statistics of relevant radar signals of FIG. 4F according to embodiments of this disclosure.
Figure 4H:
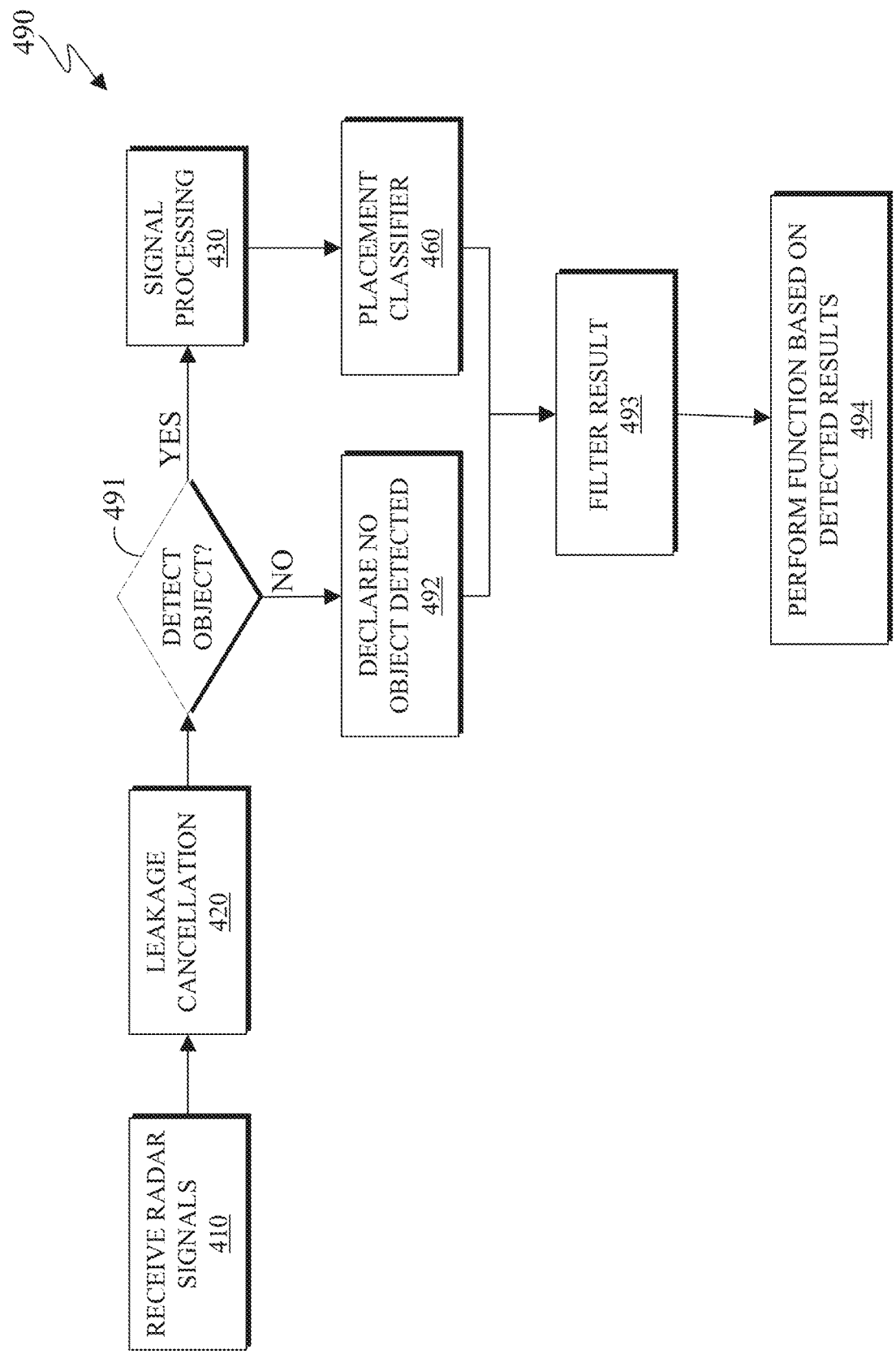
FIG. 4H illustrates an example flowchart for identifying the surrounding environment of an electronic device using radar according to embodiments of this disclosure.

FIG. 4A illustrates an example flowchart 400a for identifying the surrounding environment of an electronic device using radar according to embodiments of this disclosure. FIGS. 4B, 4C, and 4D illustrate flowcharts 400b, 400c, and 400d, respectively, for signal processing according to embodiments of this disclosure. FIGS. 4E and 4F illustrate example flowcharts 401 and 402, respectively, for identifying the surrounding environment of an electronic device using radar according to embodiments of this disclosure. FIG. 4G illustrates an example graph 470a for identifying the statistics of relevant radar signals of FIG. 4F according to embodiments of this disclosure. FIG. 4H illustrates an example flowchart 490 for identifying the surrounding environment of an electronic device using radar according to embodiments of this disclosure. The embodiments described in FIGS. 4A-4H use the environment as the object of identification (such as the target object 308 of FIG. 3A). The flowcharts 400a, 400b, 400c, 400d, 401, 402, and 490 can be performed by the electronic device 200 of FIG. 2 and the electronic device 300 of FIG. 3A.

FIG. 4A illustrates the flowchart 400a. The flowchart 400a describes an overall process to identify the surrounding environment of an electronic device. In step 410, the radar transceiver (such as the radar transceiver 270 of FIG. 2 and the transmitter 304 and receiver 306 of FIG. 3A) transmits and receives radar signals. The received radar signals (similar to the received signal 314 and the leakage 316 of FIG. 3A) can be raw radar signals from different radar configurations. For example, the received radar signals can be collected from different pulses. The received raw radar signals are collected for further analysis.

In step 420, the processor of the electronic device performs the leakage cancelation. A leakage signal is similar to the leakage 316 of FIG. 3A. Leakage corresponds to the direct transmission between the transmitter and the receiver of a transceiver, which is the self-interference signal. When the target object of interest is at close proximity to the electronic device (such as the fabric of the pocket or the hand of a user), leakage signals cause interference which can negatively affect the ability to identify the information about the surrounding environment of the electronic device. Therefore, leakage is identified and canceled to increase the reliability to identify the information about the surrounding environment of the electronic device.

In step 430, the processor of the electronic device processes and prepares the radar signals as an input into the placement classifier of step 460. The processing can be done in several different ways, and described in greater detail in FIGS. 4B, 4C, and 4D.

In step 460, the electronic device performs the placement classification. The placement classification classifies the placement of the electronic device. The placement classification can be a pattern matching approach or a machine learning approach.

FIG. 4B illustrates the flowchart 400b. The flowchart 400b is similar to the flowchart 400a of FIG. 4A but further describes the signal processing during the step 430, denoted as step 430a. In step 434, the processor processes the radar signals by identifying the beamforming image corresponding to the first delay tap. The first delay tap is the tap with the same delay as the leakage signal. For example, the processor extracts radar signals of step 432 that are associated with a pre-identified scenario, such as when the electronic device 200 is located in (i) a pocket, (ii) a bag, and (iii) held in the user's hand (referred to as handgrip). The radar beamforming images (also called the azimuth-elevation map) for the first delay tap show repeatable and distinctive patterns for the different scenarios. Therefore, after the leakage cancellation, the radar signals at the first delay tap for the different antenna configurations are extracted (step 432). The extracted signals are the input for identifying the beamforming image (step 434). It is noted that various beamforming approaches can be used such as the matched filtering, the Capon beamforming, or the Discrete Fourier Transform (DFT) beamforming. In certain embodiments, another dimension for variation is to form the beamforming at the receiver only, at the transmitter only, or at both the transmitter and the receiver. The resulting beamforming image is then input into the placement classifier at step 460 to produce an estimation of the current device placement.

FIG. 4C illustrates the flowchart 400*c*. The flowchart 400*c* is similar to the flowchart 400*a* of FIG. 4A but further describes the signal processing during the step 430, denoted as step 430*b*. It is noted that the flowchart 400*c* is also similar to the flowchart 400*b*, however in the step 430*b* the processor processes the radar signals by by-passing (skipping) the beamforming computation (as performed in the step 430*a*) and uses the extracted radar signals (of step 432) at the first delay tap directly for the placement detection. Beam forming can be omitted in the step 430*b* since the beamforming image (from a linear beamforming method such as the matched filtering type) contains the same information as the radar signals. While this approach lacks some physical interpretation, the dimensionality of the input to the placement classifier is reduced.

FIG. 4D illustrates the flowchart 400*d*. The flowchart 400*d* is similar to the flowchart 400*a* of FIG. 4A but further describes the signal processing during the step 430, denoted as step 430*c* and the placement classifier during step 460, denoted as step 460*a*. The flowchart 400*d* uses a machine learning classifier for the placement classifier (of step 460*a*) without explicitly computing the beamforming image. The signal processing at step 430*c* extracts the leakage cancelled radar signals at the first delay tap (denoted by the vector CIR_1) (step 436). That is, in step 436 the radar signals that correspond to the first delay tap, CIR_1 are extracted. The real and imaginary parts of the CIR_1 are stacked together to generate a feature vector (step 438). The feature vector will be the input to the machine learning based classifier (of step 460*a*). At step 460*a*, the placement classifier is performed based on the feature vector using the support vector machine (SVM), logistic regression, the K-nearest neighbors (KNN), random forest, naïve Bayes, various deep learning approaches (such as the convolutional neural networks), and the like.

In certain embodiments, it is also possible to also include some statistics into the generated feature vector (of step 438) beyond the real and imaginary parts. For example, the mean power and/or the variance of CIR_1, the mean and/or variance of its real part, the mean and/or variance of its imaginary part, and the like can be included into the feature vector that is generated in step 438.

Depending on the desired detection, it is beneficial to choose a different delay tap or include more taps (than using the first delay tap, as described above). For example, for an in-bag placement detection, there could be some gap between one side of the device (where the radar is installed on) and the bag. In such a case the relevant objects near the radar could span by more than just the first delay tap. Thus, for such a case it could be beneficial to also include the second delay tap into the feature vector. Again as mentioned above, any statistics of the signals at the selected taps could also be included in the input for the classifier.

FIGS. 4E and 4F describe additional steps that can be added to the flowchart 400*a* of FIG. 4A. For example, the flowchart 401 includes the temporal filtering at step 480, while the flowchart 402 includes a gating step 475 and the temporal filtering at step 480. It is noted that any of the detailed signal processing steps 430*a* of FIG. 4B, 430*b* of FIG. 4C, and 430*c* of FIG. 4D can be used in the signal processing of step 430 of FIGS. 4E and 4F.

Device placement of the electronic device has high temporal correlation. Therefore, temporal filtering of the step 480 can be included to smooth the output from the placement classifier of step 460. In certain embodiments, the temporal filtering method during the step 480 is a majority voting method for a certain number of detections (i.e., within a certain time window). In certain embodiments, the temporal filtering method during the step 480 is a weighted averaging approach that uses the confidence level of the detection (assuming available from the placement classifier) as the weights.

The gating rule of step 475 of FIG. 4F is based on the statistics of certain radar signals, such as those of the first tap after cancelling the leakage. In step 470, the electronic device 200 can identify statistics of relevant radar signals that are associated with previous device locations. In certain embodiments, the statistics can be based on a property from the radar signals. For example, the property can be a mean power of the raw radar signals. Based on the statistics, the electronic device 200 generates one or more rules. For example, if the statistics indicate that a particular value of a radar property corresponds to the electronic device being in a certain location, then a rule is generated to support the indication. The graph 470*a* of FIG. 4G, illustrates a graphical representation of various statistics associated with device placement based on the mean versus the variance of the power of the radar signals, which can be used to generate the one or more rules.

In step 475 the electronic device 200 compares the outcome of the placement classifier (step 460) with one or more of the generated rules. That is, the electronic device uses the properties of the radar signals (that are used to classify the placement of the electronic device) to reject the classification result if the classification is inconsistent with one or more of the generated rules.

The graph 470*a* of FIG. 4G illustrates a scatter plot of the mean versus the variance of the power of the radar signals after the leakage cancellation at the first delay tap for three different device placements (handgrip, in-pocket, in-bag). The graph 470*a* illustrates approximately 5,000 measurements of an electronic device at the three different device placements. It is noted that while the three placements have large area of overlap, the placements are relatively clustered together. For example, the lower left side of the graph 470*a* shows a cluster of in-bag cases, while the upper right of the graph 470*a* shows a cluster in-packet cases. Similarly, the graph 470*a* shows that it is unlikely that the handgrip will have a very large or low power, as compared to the in-pocket and in-bag, since the handgrips are clustered in the middle part of the graph 470*a*. Such observations can be used by the electronic device 200 to overrule the detection result of the classifier (of step 460) as shown in FIG. 4F.

Based on the graph 470a of FIG. 4G, the electronic device 200 can generate a rule that states if the mean power is larger than a threshold (such as 0.01), then only the in-pocket case can be accepted, otherwise overrule the classification result as inconsistent. Similarly, if the mean power is less than another threshold (such as 0.0006), only the in-bag case can be accepted, otherwise overrule the classification result as inconsistent.

FIG. 4H illustrates the example flowchart 490 for identifying the surrounding environment of an electronic device using radar. The 490 is similar to the flowchart 400a of FIG. 4A but further describes an example implementation. For example, after the leakage cancellation of step 420 is performed, the processor determines whether it detected an object in step 491. When an object is detected, processor processes the radar signals (in step 430). In certain embodiments, the signal processing can be based on the flowcharts 400b, 400c and 400d. In certain embodiments, signal processing (of step 430) can include taking an average of the CIR in the burst domain, extracting the average CIR for the leakage tap, or identifying a feature vector. After the signals are processed, the placement classifier, in step 460, identifies the environment around the electronic device based the processed signals.

If processor determines that no object is detected, in step 491, then, in step 492, the processor declares no object is detected. In step 493, the result of either classifying the environment (step 460) or declaring no object (step 492) is filtered. The filtering can be similar to the temporal filtering of step 480 of FIG. 4E or the gating step 475 of FIG. 4F, or a combination thereof. Step 493 performs filtering to smooth the detected results due to temporal correlations.

After the result of no object is detected or the environment around the electronic device is classified, a function is performed based on the detected results (step 494). For example, if the object is classified as being in a bag, the volume of the electronic device can increase. For another example, if the object is classified as located in a pocket as compared to being held by a user, another function of the electronic device can change, accordingly.

Although FIGS. 4A-4H illustrates various aspects of processing radar signals to identify the environment around the electronic device, various changes may be made to the FIGS. 4A-4H. For example, while shown as a series of steps, various steps could overlap, occur in parallel, or occur any number of times.

FIGS. 5A-5E describe embodiments of the present disclosure for using radar signals and sensor data of the electronic device to identify information about the surrounding environment of the electronic device. To use both radar signals and sensor data to identify information about the surrounding environment of the electronic device, a machine learning approach and a rules-based approach are described below.

Figure 5A:
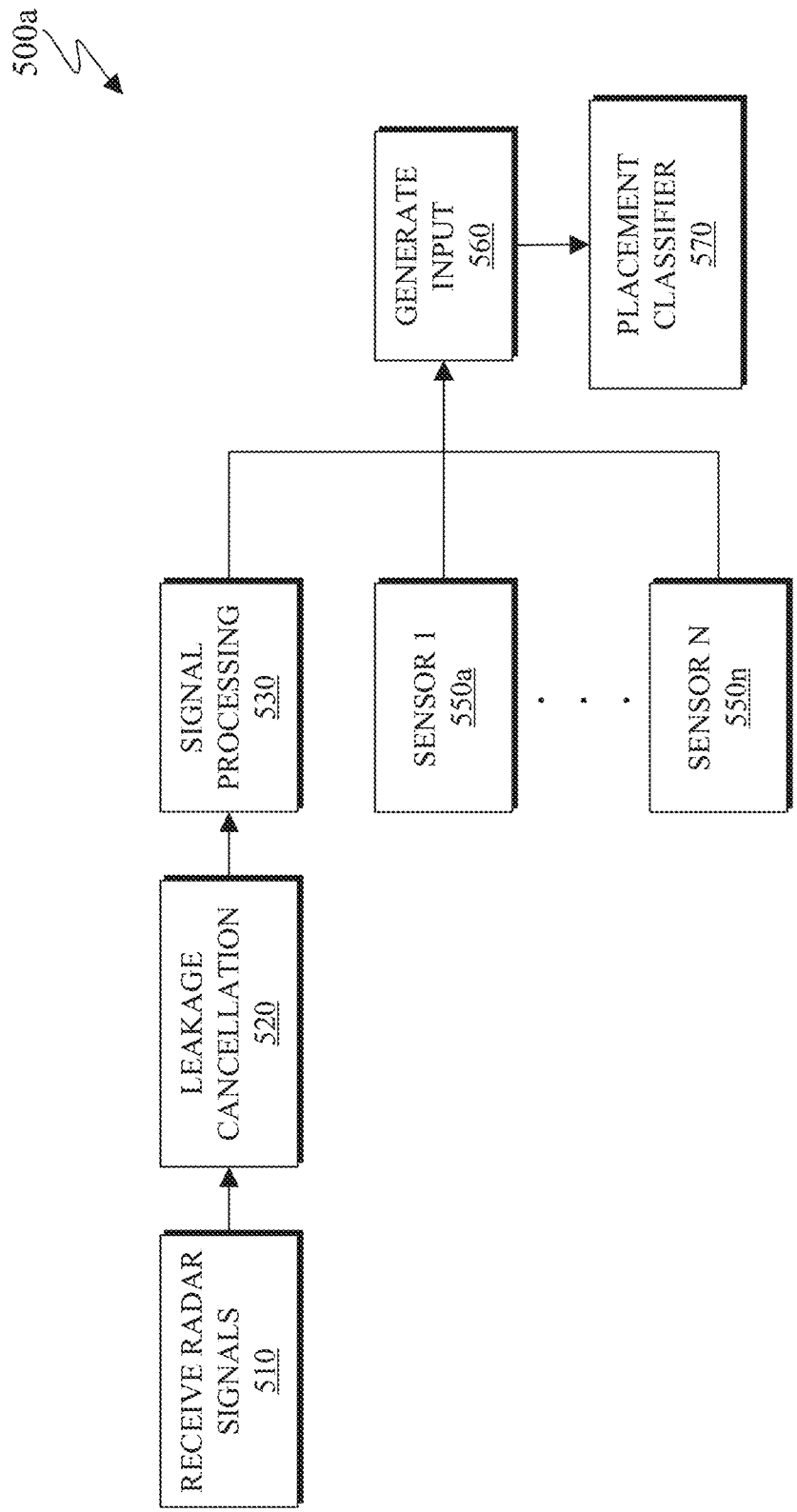
FIG. 5A illustrates an example flowchart for identifying the surrounding environment of an electronic device using radar and sensor data according to embodiments of this disclosure.
Figure 5C:
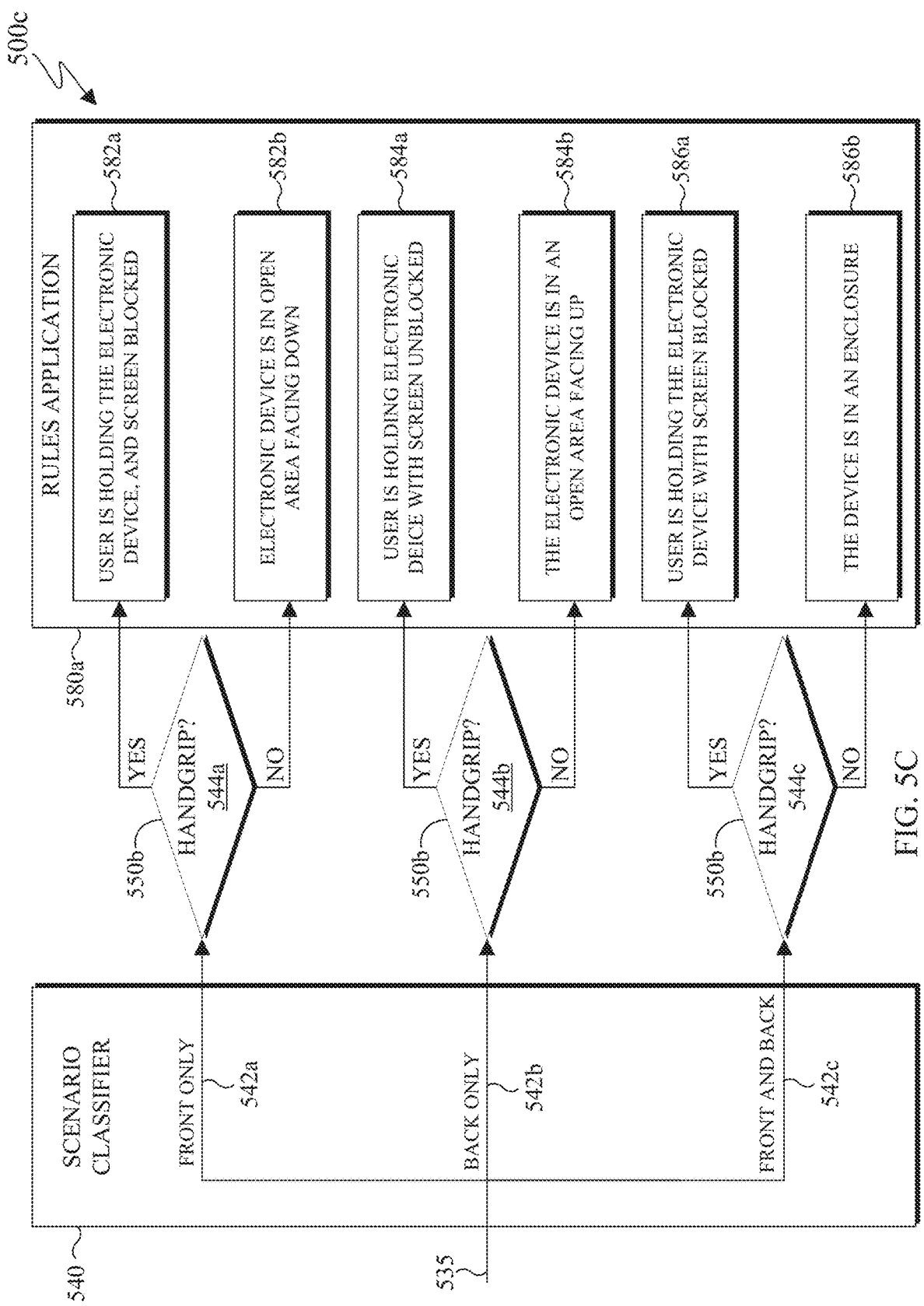
FIG. 5C illustrates example flowchart for applying rules to certain scenarios based on the flowchart of FIG. 5B, according to embodiments of this disclosure.
Figure 5D:
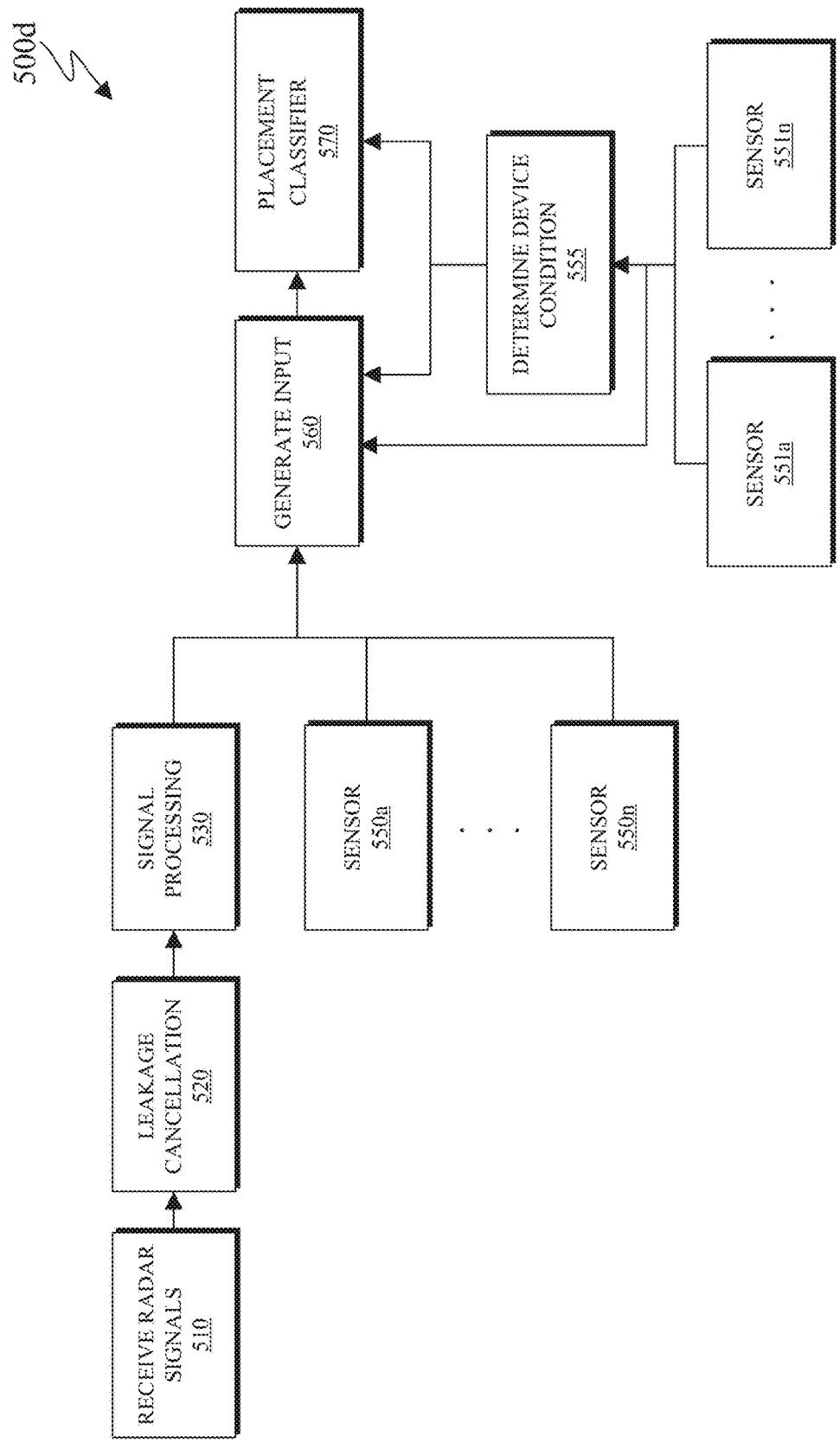
FIG. 5D illustrates an example flowchart for identifying the surrounding environment of an electronic device using radar and sensor data according to embodiments of this disclosure.
Figure 5E:
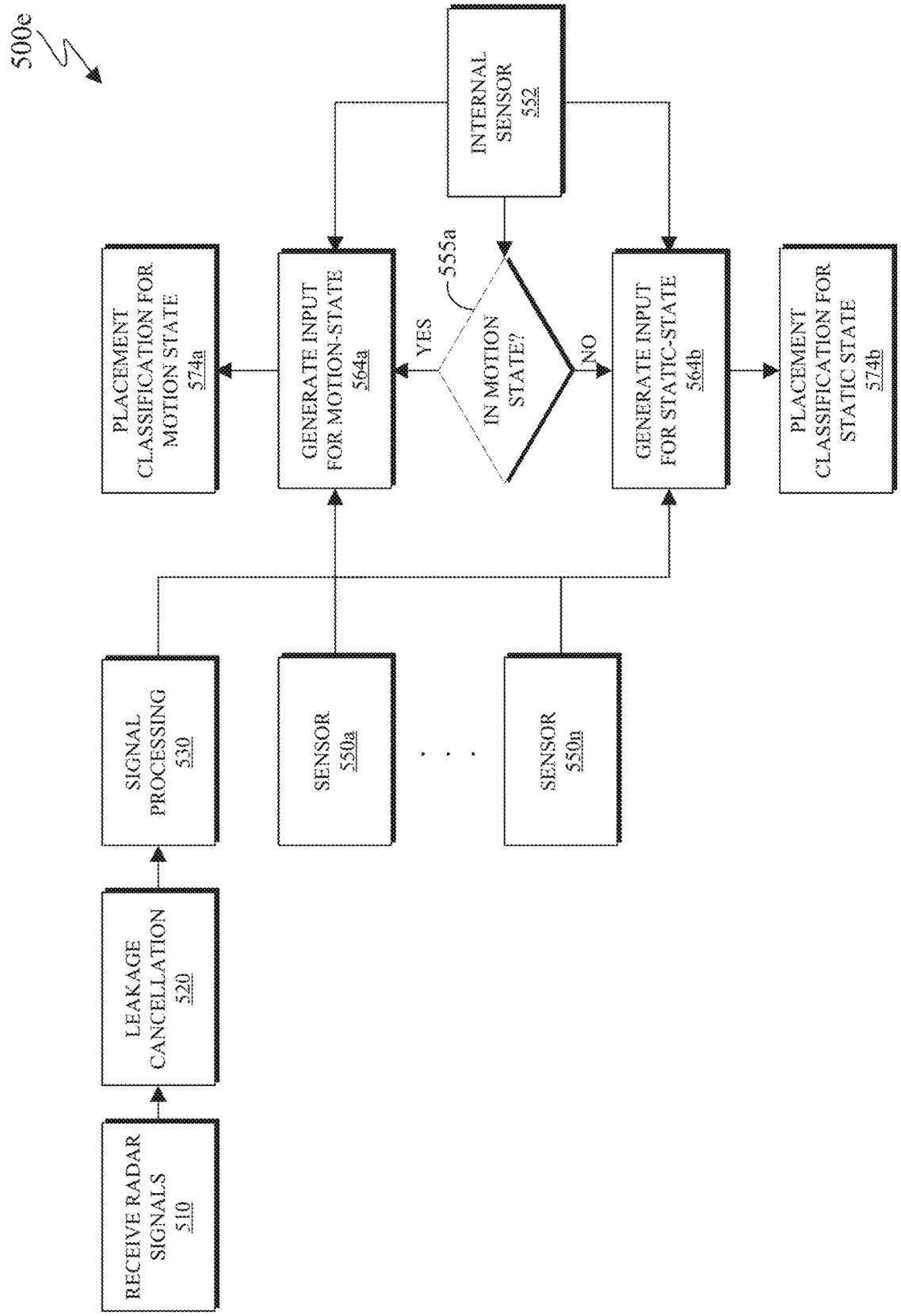
FIG. 5E illustrates an example for identifying the surrounding environment of an electronic device using radar and sensor data according to embodiments of this disclosure.

FIG. 5A illustrates an example flowchart 500a for identifying the surrounding environment of an electronic device using radar and sensor data according to embodiments of this disclosure. FIG. 5B illustrates an example flowchart 500b for identifying the surrounding environment of an electronic device using radar and sensor data according to embodiments of this disclosure FIG. 5C illustrates example flowchart 500c for applying rules to certain scenarios based on the flowchart of FIG. 5B, according to embodiments of this disclosure. FIG. 5D illustrates an example flowchart for identifying the surrounding environment of an electronic device using radar and sensor data according to embodiments of this disclosure. FIG. 5E illustrates an example flowchart 500e for identifying the surrounding environment of an electronic device using radar and sensor data according to embodiments of this disclosure.

FIG. 5A illustrates an example flowchart 500a for identifying the surrounding environment of an electronic device using radar and sensor data. The flowchart 500a describes identifying the surrounding environment of an electronic device using machine learning based on radar data and sensor data.

In step 510, the radar transceiver (such as the radar transceiver 270 of FIG. 2 and the transmitter 304 and receiver 306 of FIG. 3A) transmits and receives radar signals. The step 510 is similar to the step 410 of FIGS. 4A, 4B, 4C 4D, 4E, 4F, and 4H. The received radar signals (similar to the received signal 314 and the leakage 316 of FIG. 3A) can be raw radar signals from different radar configurations. For example, the received radar signals can be collected from different pulses. The received raw radar signals are collected for further analysis.

In step 520, a processor performs the leakage cancelation. The step 520 is similar to the step 420 of FIGS. 4A, 4B, 4C 4D, 4E, 4F, and 4H. A leakage signal is similar to the leakage 316 of FIG. 3A. Leakage corresponds to the direct transmission between the transmitter and the receiver of a transceiver, which is the self-interference signal. When the target object of interest is at close proximity to the electronic device (such as the fabric of the pocket or the hand of a user), leakage signals cause interference which can negatively affect the ability to identify the information about the surrounding environment of the electronic device. Therefore, leakage is identified and canceled to increase the reliability to identify the information about the surrounding environment of the electronic device.

Signal processing at step 530 can be similar to the steps 430, 430a, 430b, and 430c of FIGS. 4A, 4B, 4C, and 4D, respectively. For example, radar signals before or after the beamforming can be used. In certain embodiments, signal processing at step 530 can include stacking the input from the radar and other sensor into a vector.

Rather than just using the radar signals to form the input to the placement classifier of the step 570 (such as in the flowchart 400a of FIG. 4A), sensor data from sensors 550a through 550n can be used to generate the input of step 560. The sensors 550a through 550n can be similar to one or more sensors 265 of FIG. 2. For example, one of the sensors can be a gyro sensor, an optical sensors, an accelerometer, grip sensor, ambient light sensor, and the like.

In step 560, once the radar signals and sensor data (from one or more sensors of the sensors 550a through 550n) are collected, the data from the radar signals and the sensors are fused to form an input to a machine learning classifier. The preparation of the input could depend on the choice of the classifier. That is, in step 560, the input is generated and based on both the processed radar signals (of step 530) and data from one or more sensors 550a through 550n, and the selected classifier. In certain embodiments, the electronic device includes more sensors that are used to generate the input in step 560.

FIG. 5B illustrates the example flowchart 500b for identifying the surrounding environment of an electronic device using radar and sensor data. The flowchart 500b illustrates an example that uses radar detection and other sensor's reading to determine the device placement based on some logical rules. The flowchart 500b is similar to the flowchart 500a of FIG. 5A but describes using a rules-based approach (such as heuristic rules) to identify information about the surrounding environment of the electronic device. That is, the flowchart 500b determines the device placement based on one or more logical rules using radar detection and data from one or more sensors of the electronic device.

In step 540, the radar signals are used to determine the scenarios that the device is in. That is, the radar signals are not used to directly identify the device placement, but rather the radar signals are used to determine the scenarios that the device is in. Thereafter the rules are used to identify the environment of the electronic device, based on sensor data and the identified scenario. The radar signals determine a scenario such as where an object is located with respect to the electronic device itself. For example, an object that is detected only on the back side of the electronic device, corresponds to a back only scenario. An object can be detected on the back of the electronic device such as when the electronic device is located on a flat surface, with the display of the electronic device facing away from the object. For another example, an object that is detected on only the front of the electronic device, corresponds to a front only scenario. An object can be detected on the front of the electronic device such as when the electronic device is located on a flat surface, with the display of the electronic device facing the object. For yet another example, objects that that are detected on both the front and the back of the electronic device, corresponds to a front and back scenario. Objects can be located on both the front and back of the electronic device such as when the electronic device is located in a pocket or in a bag.

It is noted that detecting an object on either the back of the device or on both the front and back of the device does not necessarily indicate the device placement. For example, if a target object is identified via the radar as located on both at both the front and back sides of the device, there is still ambiguity between the in-pocket and in-bag placement. Sensor data from the sensors 550a through 550n can be used to identify the environment around the electronic device.

Rather than labeling the placement of the electronic device (as performed in step 570 of FIG. 5A), the scenarios are label. In certain embodiments, one set of scenarios can be (i) a target at the front side of the electronic device, (ii) a target at the at back side of the electronic device, and (iii) targets at both front and back of the electronic device. Another set of scenarios would be to indicate if there is a target present in some rough set of angles (such as, we could divide the sphere into eight equal partitions). Depending on the choice of the set of scenarios and other sensors available on the electronic device, logical rules may be designed.

As such, in step 580, the rules are applied based on the classified scenario and the sensor data from the sensors 550a through 550n. The rules are customized to the desired detection, the types of sensors, as well as the sensors' locations on the device. Based on the application of the rules, in step 580, the environment around the electronic device is identified.

FIG. 5C illustrates example flowchart 500c for applying rules to certain scenarios and sensor data based on the flowchart 500b of FIG. 5B. For example, in step 540 the processed radar signals 535 (from step 530) are classified into three separate scenarios (or classifications). The first scenario is denoted as front only 542a and occurs when an object is located on the front of the device, as detected by the radar. The second scenario is denoted as back only 542b and occurs when an object is located on the back of the device, as detected by the radar. The third scenario is denoted as front and back 542c and occurs when an object is located on both the back of the device and the front of the device, as detected by the radar.

The handgrip sensor 550b provides data indicating whether the electronic device is held by the user. Based on the identified scenario. For example, the handgrip sensor 550b (such as a capacitive sensor) can outputs true or false value indicating whether a user is holding the device. Therefore based on the scenarios, and the output from the handgrip sensor 550b, the electronic device selects certain logical rules to apply in order to determine the environment (or location) that the electronic device is within.

For example, when the rules of step 580, of FIG. 5B, are applied, the rules application 580a indicates detailed device placements (the environment around the electronic device) based on the identified scenario, via the radar signals, and sensor data (such as sensors 550a through 550n), such as the handgrip sensor 550b. Based on the radar detection and the handgrip sensor 550b, several device contexts are inferred by the applying rules via the rules application 580a.

For example, when the scenario classifier (in step 540) indicates that there is an object located on the front of the device (based on the radar signals 535) and the handgrip sensor 550b indicates that the electronic device is held, the detailed information 582a based on a rule, indicates that the user is holding the electronic device and the display screen is blocked. When the scenario classifier (in step 540) indicates that there is an object located on the front of the device (based on the radar signals 535) and the handgrip sensor 550b indicates that the electronic device is not held, the detailed information 582b based on a rule, indicates that the electronic device is in an open area with the display facing the detected object. When the scenario classifier (in step 540) indicates that there is an object located on the back of the device (based on the radar signals 535) and the handgrip sensor 550b indicates that the electronic device is held, the detailed information 584a based on a rule, indicates that the user is holding the electronic device with the display screen unblocked. When the scenario classifier (in step 540) indicates that there is an object located on the back of the device (based on the radar signals 535) and the handgrip sensor 550b indicates that the electronic device is not held, the detailed information 584b based on a rule, indicates that the electronic device is in an open area with the display is not facing the detected object. When the scenario classifier indicates (in step 540) that there is an object located on both the front and the back of the device (based on the radar signals 535) and the handgrip sensor 550b indicates that the electronic device is held, the detailed information 586a based on a rule, indicates that the user is holding the electronic device and the display screen is blocked. When the scenario classifier (in step 540) indicates that there is an object located on both the front and the back of the device (based on the radar signals 535) and the handgrip sensor 550b indicates that the electronic device is not held, the detailed information 586b based on a rule, indicates that the electronic device is in an enclosure, such as a desk drawer, a pocket, or a bag, and the like.

While the example of FIG. 5C is from the device point-of-view, in certain embodiments, it is possible to infer if the device is in active usage or not, based on the radar signals 535 and sensor data. For example, if the user is holding the device with the screen blocked, it is unlikely that the user is actively interact with the device, even though background applications such as a music player could still be running.

FIG. 5D illustrates an example flowchart 500d for identifying the surrounding environment of an electronic device using radar and sensor data according to embodiments of this disclosure. An example flowchart 500d uses both the radar and sensors for device placement detection. In this embodiment, the sensors are divided into two groups (i) sensors for device condition determination and (ii) other sensors. Once the device condition is determined, the input as well as the placement classifier will be selected according to the device condition. Note that, the sensors used for the device condition determination may or may not be used as the input to the classifier.

The flowchart 500d describes using certain sensor data to determine the condition the device is in and perform the detection accordingly using radar and sensors. In step 555 the electronic device determines a condition based on data from the sensors 551a through sensors 551n. The sensors 551a through 551n can include the same or different sensors as the sensors 550a through 550n. That is, the sensors 551a through 551n that are used for the device condition determination of step 555 may or may not be included as the input, which is generated in the step 560 to the placement classification (of step 570).

Different approaches could be used for the condition determination that include signal processing approaches, machine learning approaches, or some heuristic rules. Different definitions of device conditions are possible. For example, the motion state could be used as the device condition, as illustrated in FIG. 5E. Once the condition of the device is determined (in step 555), the appropriate placement classifier (e.g., corresponding to the motion state) is selected for making the classification.

In step 560, depending on the choice of the classifier, the input could be selected differently in accordance to the selected placement classifier. For example, in a static state, accelerometer might not provide any useful information and thus can be excluded from the input for the placement classification. For example, the input is generated in step 560 based on the processed radar signals of step 530, the sensor data from the sensors 550a through 550n, the sensor data from the sensors 551a through 551n (which may be the same or different than the sensors 550a through 550n), and the determined condition from step 555.

In step 570, the placement (environment) surrounding the electronic device is identified based on the identified condition of step 555 and the input of that is generated in step 560. The placement classification is trained on the data corresponding to the device condition of step 555 as well as the input of step 560.

It is noted that the flowchart 500d can be is illustrated as being a machine learning based classifier however in other embodiments, the flowchart 500d can be rules-based approach to classify the placement (environment) of the electronic device. For example, the placement classifier of step 570 is a machine learning approach however the machine learning approach can be replaced with the rules of step 580 of FIG. 5B.

FIG. 5E illustrates the flowchart 500e for identifying the surrounding environment of an electronic device using radar and sensor data according to embodiments of this disclosure. The flowchart 500e is an example based on the flowchart 500d of FIG. 5D.

For example, the flowchart 500e uses both the radar and sensors for device placement detection with device condition determination capability. In this case, the motion state is used as the condition and the inertial sensor is used for the condition determination. There are two conditions: motion state and static state. Depending on the motion state condition, both the input preparation module and the placement classifier are chosen accordingly.

The inertial sensor 552 can be one of the sensors 551a through 551n of FIG. 5D. The inertial sensor 552 detects motion and generates data based on the motion of electronic device. The data from the inertial sensor 552 is used to determine if the device is in motion state (such as when the device is in a user's pocket or bag or handheld or attached to some part of the body, while the user is walking or running) or in a static case (not moving, such as on a desk or in a drawer). For example, based on the motion data, in step 555a, the electronic device determines whether the electronic device is in motion.

When the electronic device determines that the electronic device is in motion, the electronic device, in step 564a, generates an input corresponding to the in-motion state. The input is based on the received radar signals via the step 530 (signal processing), sensor data from the sensors 550a through 550n, and the inertial sensor 552. In step 574a, the electronic device performs the placement classification for a motion state based on the generated input of step 564a.

When the electronic device determines that the electronic device is in a static state (non-motion), the electronic device, in step 564b, generates an input corresponding to the static-state. The input is based on the received radar signals via the step 530 (signal processing), sensor data from the sensors 550a through 550n, and the inertial sensor 552. In step 574b, the electronic device performs the placement classification for a motion state based on the generated input of step 564b.

Although FIGS. 5A-5E illustrates various aspects of processing radar signals to identify the environment around the electronic device, various changes may be made to the FIGS. 5A-5E. For example, while shown as a series of steps, various steps could overlap, occur in parallel, or occur any number of times.

In addition to identifying the environment around the electronic device, the electronic device is able to extract information from the environment. For example, using radar, the electronic device can detect and read information from a pattern code. FIGS. 6A-10b describe using radar to identify and extract information from a pattern code that is within the environment. The pattern code can be used to tag goods, person identification, identifying the presence of a cover of an electronic device (such as whether a cover is covering the display of a phone), and the like. A pattern code includes two components, the pattern code itself (as shown in FIGS. 6A, 6B, and 6C), and the reader of the pattern code (as described in FIGS. 7A-7C).

Figure 6C:
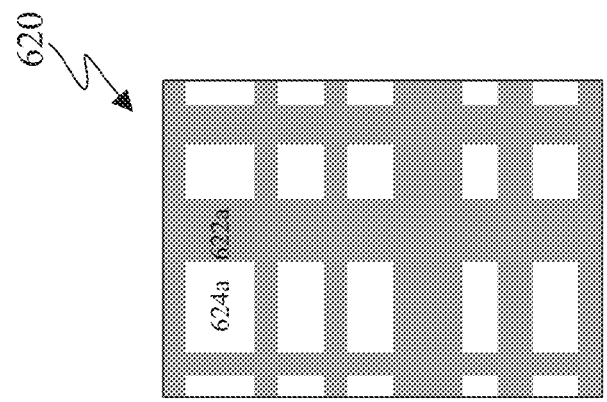
FIGS. 6A, 6B, and 6C illustrate example pattern codes according to embodiments of this disclosure.
Figure 6B:
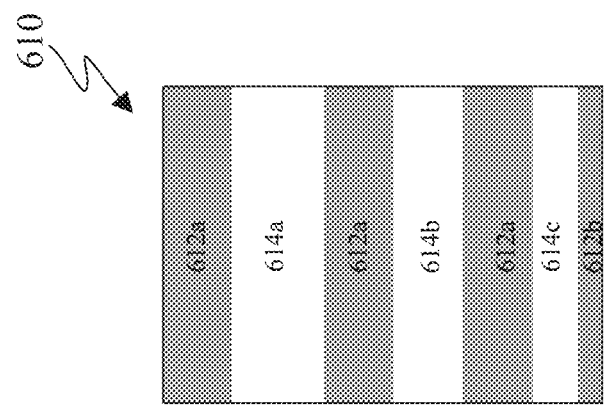
Figure 6A:
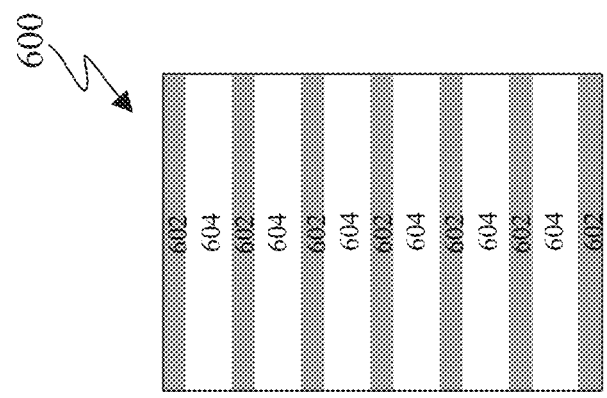

FIGS. 6A, 6B, and 6C illustrate example pattern codes according to embodiments of this disclosure. The pattern code is created using material reflective to the radar signal. For example, the pattern code could be produced using metallic materials that are typically highly reflective to radio signals.

The pattern code design depends on the application requirement and the reader (the electronic device which transmits and receives the reflected radar signals). A first type of application is for identification, which is used for identifying a pattern code. Upon identifying the pattern code the electronic device performs an action. For example, the pattern code can be embedded within a screen cover, and upon detecting the pattern code within the screen cover, the electronic device performs a certain action, such as turning off the screen. The second type of application is for extracting (decoding) the encoded information from pattern code itself similar to a barcode. It is noted that the pattern code could be read by a stand-alone radar (only have radar functionality) or it could be a multi-functional device (such as radar and communication), similar to the electronic device 200 of FIG. 2.

In certain embodiments, pattern codes are one-dimensional (1D), and includes strips of reflective and non-reflective material that are laid out in a single direction (such as horizontal or vertical). Based on the strip spacing (the spacing between reflective strips) and the strip width (the width of the reflective strips), the electronic device can identify a 1D pattern code and/or decode information from the pattern code.

FIG. 6A illustrates a pattern code 600 that is 1D and FIG. 6B illustrates a pattern code 610 that is 1D pattern code. The pattern code 600, of FIG. 6A, includes reflective strips 604 that include a uniform width and are uniformly spaced between non-reflective areas 602. The non-reflective areas 602 can be non-reflective strips of a given width. For example, the pattern code 600 includes alternating horizontal strips of a reflective material (reflective strips 604) and strips of non-reflective areas (non-reflective areas 602) that are uniformly spaced. In certain embodiments, the pattern code 600 can be rotated 90 degrees, such that the strips of the pattern code is oriented vertically instead of horizontally, as shown.

The pattern code 610, of FIG. 6B, includes reflective strips of varying widths such as the reflective strips 614a, 614b, and 614c that are spaced apart by the non-reflective areas 612a and 612b. The non-reflective areas 612a and 612b can be non-reflective strips of a differing width. For example, the pattern code 610 includes alternating horizontal strips of a reflective material of varying widths (such as the reflective strips 614a, 614b, and 614b) and non-reflective areas (non-reflective areas 612a and 612b) of varying widths.

In certain embodiments, pattern codes are two-dimensional (2D), that includes strips of reflective and non-reflective material that are laid out in multiple directions. An electronic device with a radar with two-dimensional spatial resolution can identify and/or decode information from the 2D pattern code. Based on the strip spacing (the spacing between reflective strips), the strip width (the width of the reflective strips), and the direction of the reflective and the non-reflective strips, the electronic device can identify and decode information from the 2D pattern code.

The pattern code 620, of FIG. 6C, includes reflective strips of varying widths in varying directions. For example, the pattern code 620 illustrates vertical and horizontal metallic strips such as the strip 622a with different widths and spacing.

In certain embodiments, the pattern code is for identification purposes only. For example, when an electronic device detects any pattern code, a certain function can occur. For instance, if the cover of the electronic device is embedded with a pattern code, the electronic device can turn off its screen upon identifying the presence of the pattern code. If the purpose of the pattern code is for identification only, then the pattern code is designed to optimize the identification accuracy.

In certain embodiments, the pattern code is encoded with information that can be extracted by the electronic device. It is noted that the pattern code can be either a 1D or 2D pattern code and still include information.

Depending on the radar capability, the electronic device may be unable to read a 2D pattern code. For example, if linear arrays of the radar antennas of the transceiver are used, the electronic device may be only able to obtain angular information in 1D only (such as the pattern codes of FIGS. 6A and 6B). That is the electronic device using a linear array of antennas may be only able to read the pattern code is along its vertical dimension (or the horizontal dimension depending on the array's orientation). For another example, if planar arrays of the radar antennas of the transceiver are used, then both horizontal and vertical dimensions (i.e., a grid type of patterns) can be used for designing the pattern codes.

Although FIGS. 6A-6C illustrates various examples of a pattern codes, various changes may be made to the FIGS. 6A-6C. For example, the widths, of the strips can vary as well as the layout of the strips can change.

Figure 7A:
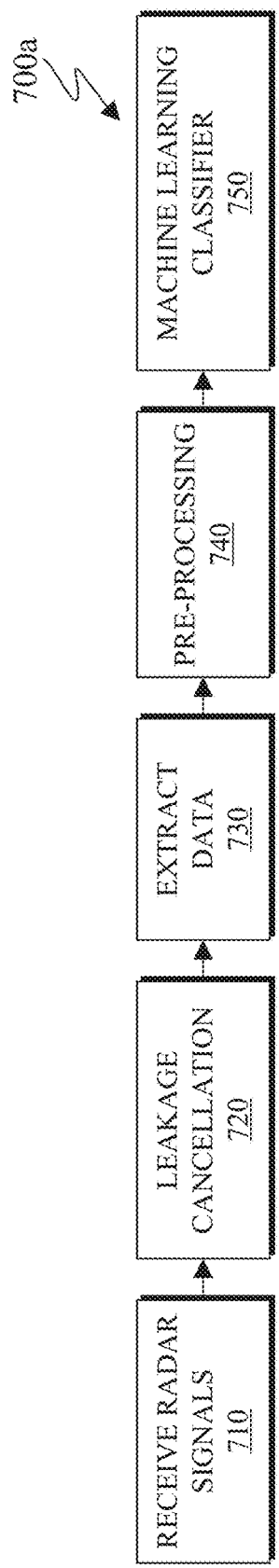
FIGS. 7A, 7B, and 7C illustrate example flowcharts for identifying a pattern code using radar according to embodiments of this disclosure.
Figure 7B:
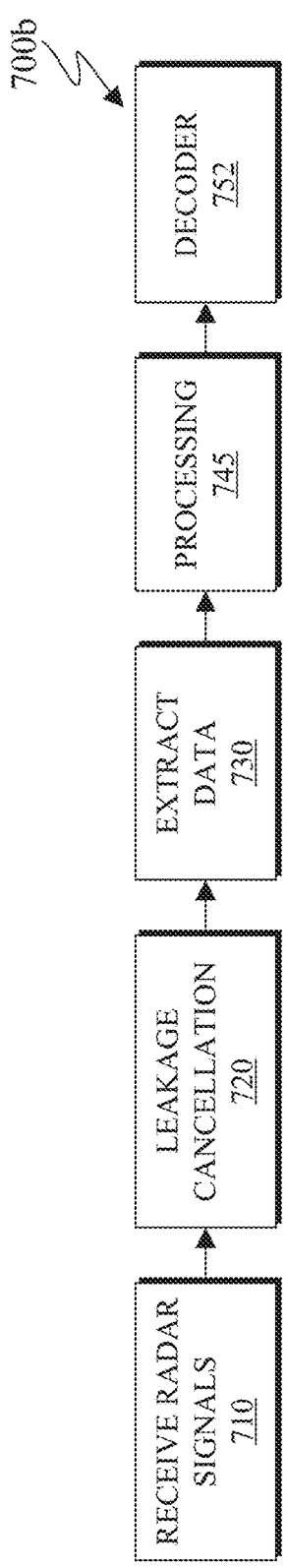
Figure 7C:
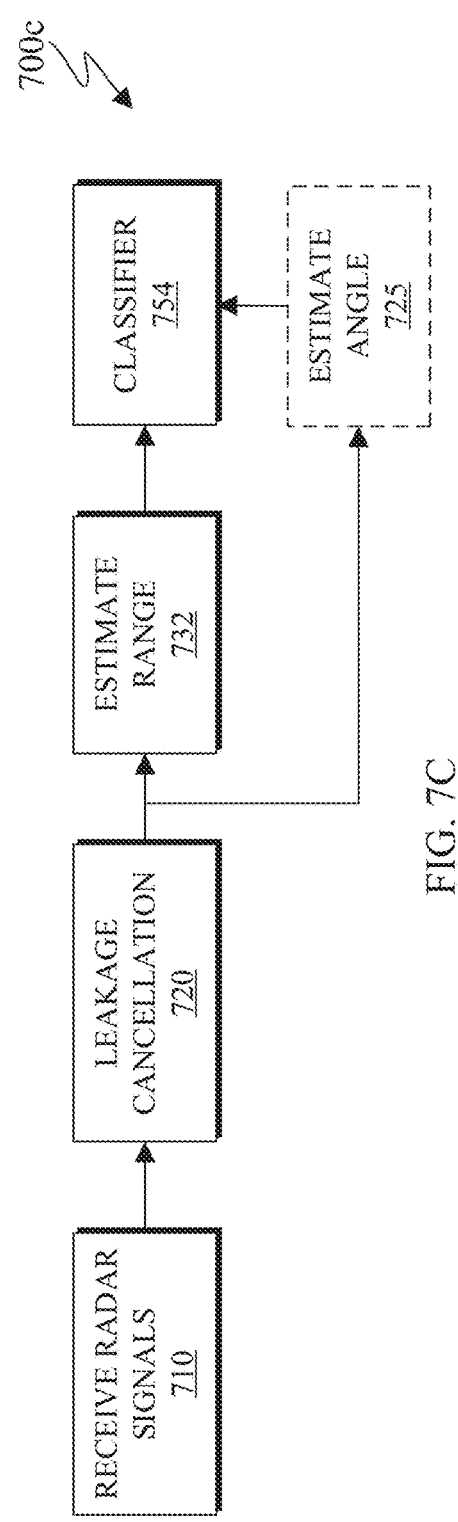

FIGS. 7A, 7B, and 7C illustrate example flowcharts for identifying a pattern code. For example, FIG. 7A describes the flowchart 700a which uses a radar reader and machine learning to read the pattern code and identify information about the pattern code. FIG. 7B describes the flowchart 700b, which uses radar signals (by beamforming to determine angles and ranging information to infer the strip spacing and width) to estimate the spacing and width of the strips of the pattern code in order to decode the pattern code. FIG. 7C describes the flowchart 700c, which uses ranging information from the radar signals to read the pattern code. Various changes can be made to FIGS. 7A-7C. For example, while various embodiments are shown as a series of steps, various steps could overlap, occur in parallel, or occur multiple times.

The flowchart 700a of FIG. 7A describes a machine learning approach for an electronic device using radar to identify a pattern code. In step 710, the radar transceiver (such as the radar transceiver 270 of FIG. 2 and the transmitter 304 and receiver 306 of FIG. 3A) of an electronic device (such as the electronic device 200 of FIG. 2 or the electronic device 300 of FIG. 3) transmits radar signals towards the pattern code. The pattern code being of both a reflective and non-reflective material reflects the radar signals back at different power levels, which are received by the transceiver. The step 710 is similar to the step 410 of FIGS. 4A, 4B, 4C 4D, 4E, 4F, and 4H and the step 510 of FIGS. 5A, 5B, 5D, and 5E.

In step 720, the processor of the electronic device performs the leakage cancelation. A leakage signal is similar to the leakage 316 of FIG. 3A, step 420 of FIGS. 4A, 4B, 4C 4D, 4E, 4F, and 4H, and step 520 of FIGS. 5A, 5B, 5D, and 5E. Leakage corresponds to the direct transmission between the transmitter and the receiver of a transceiver, which is the self-interference signal. When the target object of interest is at close proximity to the electronic device (such as the fabric of the pocket or the hand of a user), leakage signals cause interference which can negatively affect the ability to identify the information about the surrounding environment of the electronic device. Therefore, leakage is identified and canceled to increase the reliability to identify the information about the surrounding environment of the electronic device.

In step 730, the relevant radar measurements are extracted (or selected). One example approach to extract the radar measurements is to first process the radar signals to obtain the range information corresponding to the location of the pattern code. Then, the signals at the delay tap (and its adjacent taps) corresponding to the range information is be extracted for feeding to a machine learning classifier. In step 740, the extracted radar signals are processed. For example, the extracted radar signals can be normalized with respect to the noise floor. This way, in step 750, the machine learning classifier will not depend on the noise floor absolute value and thus could be more robust to the variation in different devices. Alternatively, in step 730 beamforming is performed to generate 2D maps as the input to the classifier of step 750.

In step 750, the machine learning classifier uses k nearest neighbors, support vector machine, random forest, convolutional neural network, recurrent neural networks, and the like to identify the pattern code.

The flowchart 700b of FIG. 7B describes a radar processing approach (such as beam forming and/or range estimation technology) for an electronic device using radar to determine the spacing and width of the strips or the ratio of spacing and strip width of a pattern code. In step 745, the radar processing is performed to directly estimate the spacing and the width of the strips directly. The obtained estimates of the spacing and widths of the strips are essentially the demodulated signals, which can then be input into the decoder at step 752 to produce the final output (such as the contents or identify of the pattern code).

The flowchart 700c of FIG. 7C describes an example where the radar has good range resolution, and such range estimates of the strips could also be used as a radar processing output for identifying/decoding the pattern code. Depending on the radar capability of the electronic device, the angle estimates could also be used as the input(s) into the classifier (such as the machine learning classifier of step 750 of FIG. 7A) or the decoder (such as the decoder of step 752 of FIG. 7B). In step 732 the electronic device estimates the range. The range can be identified by using a single antenna. If the radar uses single element, then these ranges of the strips will be used directly. If multiple antennas are used by the transceiver and angular information is obtained, such as in step 725, the angular information can be added to help the classifier detect the pattern code in step 754.

Although FIGS. 7A-7C illustrates various aspects of processing radar signals to identify the information from a pattern code, various changes may be made to the FIGS. 7A-7C. For example, while shown as a series of steps, various steps could overlap, occur in parallel, or occur any number of times.

Figure 8A:
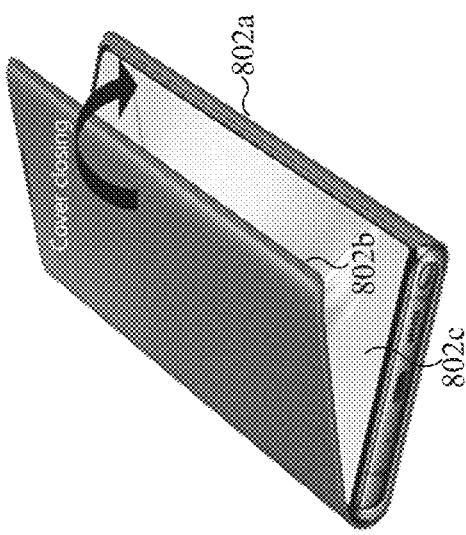
FIG. 8A illustrates a diagram of an electronic device with a cover; according to embodiments of this disclosure.
Figure 8B:
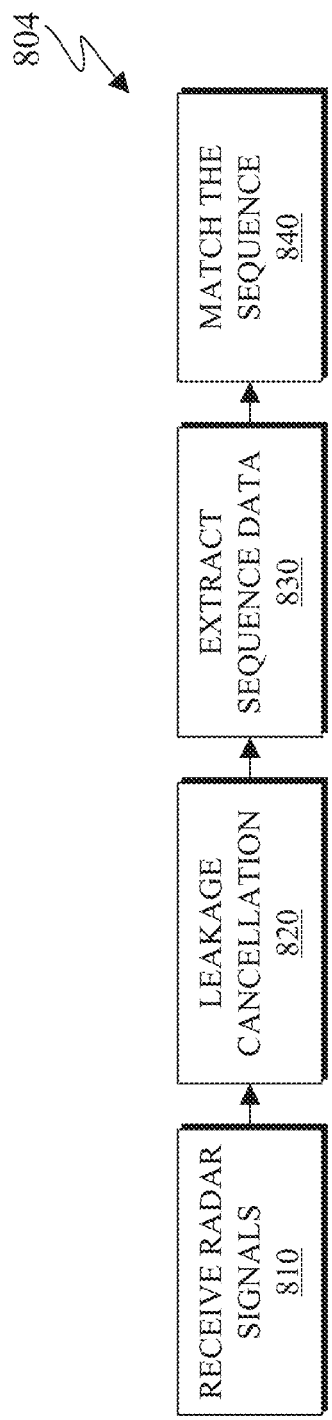
FIG. 8B illustrates an example flowchart for identifying whether the cover of FIG. 8A is being closed using radar according to embodiments of this disclosure.

FIG. 8A illustrates a diagram of an electronic device 802a with a cover 802b; according to embodiments of this disclosure. FIGS. 8B, 8C, and 8D illustrate example flowcharts 804, 806a, and 806b for identifying whether the cover of FIG. 8D is being closed using radar according to embodiments of this disclosure. Various changes can be made to FIGS. 8A-8D. For example, while various embodiments are shown as a series of steps, various steps could overlap, occur in parallel, or occur multiple times.

FIG. 8A illustrates a diagram of an electronic device 802a with a display 802c and a cover 802b. As illustrated the cover 802b is in the process of closing to cover the display 802c.

Radar can be used to detect the presence of the screen cover. The presence of a screen cover can be used to infer the usage status of the device. The flowchart 804 of FIG. 8B describes the process of using pattern code that is either on (positioned on the surface of the cover 802b that is visible to the user by the multiple reflective strips) or embedded within (within the cover itself and not visible to a user) the cover 802b. When the pattern code that is included on the cover 802b is identified the electronic device can perform a certain action. That is, the electronic device does not read/decode information from the pattern code, rather it simply performs an action upon identifying the particular pattern code that is within the cover 802b of the electronic device 802a.

In step 810, the radar transceiver (such as the radar transceiver 270 of FIG. 2 and the transmitter 304 and receiver 306 of FIG. 3A) of an electronic device (such as the electronic device 200 of FIG. 2 or the electronic device 300 of FIG. 3) transmits radar signals towards the cover 802b that includes the pattern code. The pattern code being of both a reflective and non-reflective material reflects the radar signals back at different power levels, which are received by the transceiver. The step 810 is similar to the step 410 of FIGS. 4A, 4B, 4C, 4D, 4E, 4F, and 4H, the step 510 of FIGS. 5A, 5B, 5D, and 5E, and the step 710 of FIGS. 7A, 7B, and 7C.

In step 820, the processor of the electronic device performs the leakage cancelation. A leakage signal is similar to the leakage 316 of FIG. 3A, step 420 of FIGS. 4A, 4B, 4C 4D, 4E, 4F, and 4H, step 520 of FIGS. 5A, 5B, 5D, and 5E, and step 720 of FIGS. 7A, 7B, and 7C. Leakage corresponds to the direct transmission between the transmitter and the receiver of a transceiver, which is the self-interference signal. When the target object of interest is at close proximity to the electronic device (such as the fabric of the pocket or the hand of a user), leakage signals cause interference which can negatively affect the ability to identify the information about the surrounding environment of the electronic device. Therefore, leakage is identified and canceled to increase the reliability to identify the information about the surrounding environment of the electronic device.

In step 830 the sequence of relevant radar data is extracted (selected). Since the cover 802b is attached to electronic device 802a via a case, the cover 802b will follow the same pattern when closing to protect the display 802c. As such the electronic device in step 830 extracts sequence data from the radar signals that corresponds to the sequence of radar measurements during the time that the cover 802b is being moved to cover the display 802c. That is, the extracted sequence data is based on a temporal correlation. In step 840, the electronic device matches the extracted sequence data to determine whether the cover is being closed. For example, the electronic device determines whether the pre-defined sequence data matches the extracted sequence data of step 830. When the pre-defined sequence data matches the extracted sequence data, then the electronic device determines that the cover 802b is in the process of closing.

The flowchart 806a and 806b of FIGS. 8C and 8D, respectively, leverage the movement during the time that the cover 802b is being turned toward the display 802c to do the leakage cancellation (of step 820) in the Doppler domain. This way, the leakage cancellation of step 820 of FIG. 8B is omitted in the flowcharts 806a and 806b. An example implementation using a single shot identification with a machine learning classifier is illustrated in FIG. 8C. Similarly, it is also possible to combine the leakage estimation (of the flowchart 806a of FIG. 8C) with the sequence-based identification (of the flowchart 804 of FIG. 8B) as shown in FIG. 8D. It is noted that in order to be able to not perform the leakage cancelation in the Doppler domain, movement is required to detect whether the cover 802b is moving towards the display 802c of the electronic device 802a.

The flowchart 806a of FIG. 8C describes leveraging the movement of the cover that is being turned over to eliminate the need for explicit leakage cancellation (via step 820 of FIG. 8B). In this implementation, a single shot identification using a machine learning classifier is used.

In step 810a radar signals are collected over a period of time. The step 810a is similar to the step 810 of FIG. 8B. In step 812, Fourier transform (such as a Fast Fourier Transform) is applied to the received radar signals to obtain Doppler information. In step 814, the 0-Doppler component is canceled. Since leakage is static with respect to the radar transmitter and receiver, it will fall into the 0-Doppler component, and canceled in step 814.

Step 850 is similar to the step 730 of FIGS. 7A and 7B. For example, in step 850, the relevant radar measurements are extracted. One example approach to extract the radar measurements is to first process the radar signals to obtain the range information corresponding to the location of the pattern code. Then, the signals at the delay tap (and its adjacent taps) corresponding to the range information is be extracted for feeding to a machine learning classifier.

Step 860 is similar to the step 740 of FIG. 7A. 7B. For example, in step 860 the extracted radar signals are processed. For instance, the extracted radar signals can be normalized with respect to the noise floor. This way, in step 870, the machine learning classifier will not depend on the noise floor absolute value and thus could be more robust to the variation in different devices. Step 870 is similar to the step 750 of FIG. 7A.

The flowchart 806b of FIG. 8D describes leveraging the cover movement for leakage cancellation and applying a sequence-based matching. After the 0-Doppler component is canceled (per step 814) in step 830a, the sequence of relevant radar data is extracted from the remaining Doppler information. It is noted that step 830a is similar to the step 830 of FIG. 8B. Since the cover 802b is attached to electronic device 802a via a case, the cover 802b will follow the same pattern when closing to protect the display 802c. As such the electronic device in step 830a extracts sequence data from the remaining doppler information that corresponds to the sequence of radar measurements during the time that the cover 802b is being moved to cover the display 802c.

Step 840a is similar to the step 840 of FIG. 8B. For example, in step 840a electronic device matches the extracted sequence data to determine whether the cover is being closed. For example, the electronic device determines whether the pre-defined sequence data matches the extracted sequence data of step 830. When the pre-defined sequence data matches the extracted sequence data, then the electronic device can determine that the cover 802b is in the process of closing.

Although FIGS. 8A-8D illustrates various aspects of processing radar signals to identify whether a cover of an electronic device is closing, various changes may be made to the FIGS. 8A-8D. For example, while shown as a series of steps, various steps could overlap, occur in parallel, or occur any number of times.

FIGS. 9A-9G describe a bit conductors that enable an electronic device via a radar (such as the radar transceiver 270 of FIG. 3 and the transmitter 304 and the receiver 306 of FIG. 3A) to identify the placement of the cover of the electronic device. Bit conductors are similar to a pattern code and can be used to identify whether the cover of the electronic device is over the display screen.

Figure 9A:
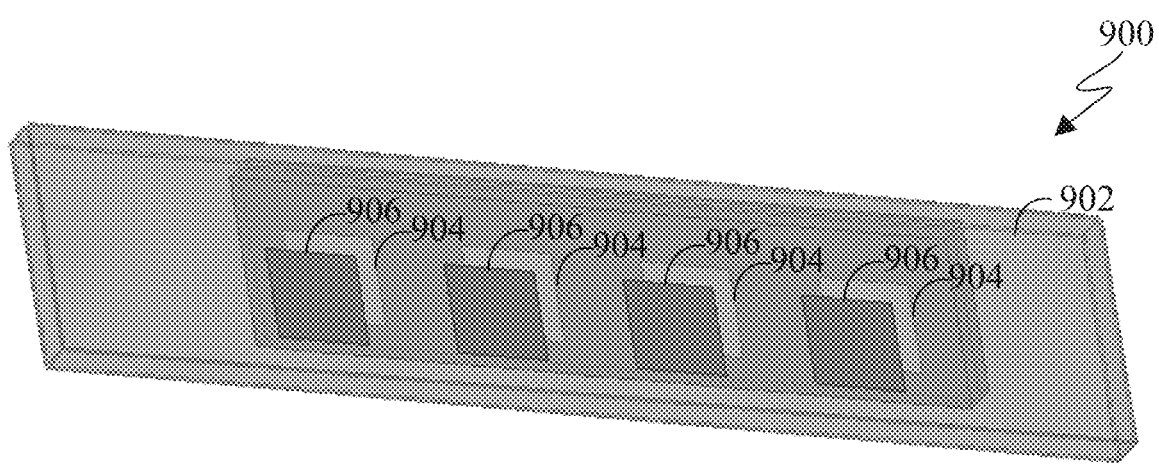
FIG. 9A illustrates a diagram of screen over with embedded bit conductors according to embodiments of this disclosure.
Figure 9B:
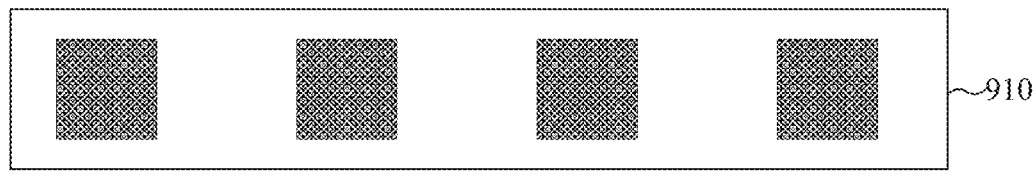
FIG. 9B illustrates example configurations of the bit conductor according to embodiments of this disclosure.
Figure 9B:
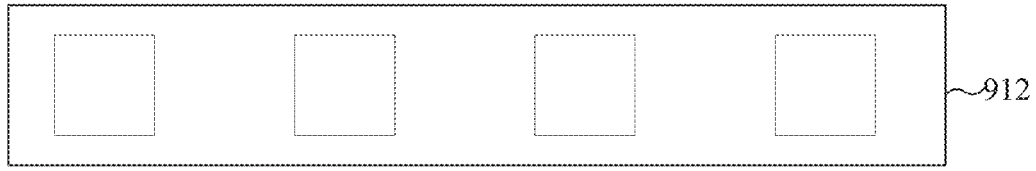
Figure 9B:
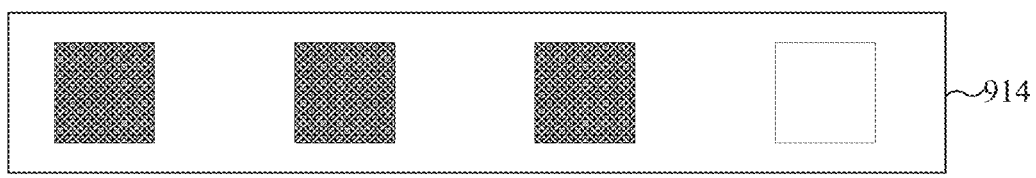
Figure 9B:
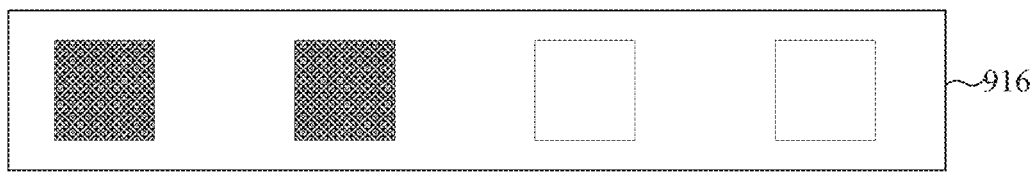
Figure 9B:
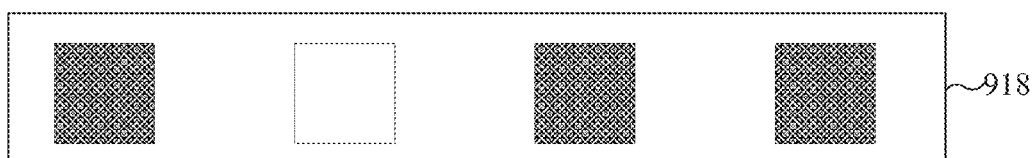

For example, FIG. 9A illustrates a diagram 900 of screen cover with embedded bit conductors according to embodiments of this disclosure. FIG. 9B illustrates example configurations of the bit conductor of FIG. 9A according to embodiments of this disclosure. FIGS. 9C, 9D, 9E, 9F, and 9G illustrate various results associated with different bit conductor configurations. Various changes can be made to FIGS. 9A-9G.

FIG. 9A illustrates the diagram 900 of screen cover with embedded bit conductors. The diagram 900 includes a cover 902 of an electronic device, such as the electronic device 200 of FIG. 2 and the electronic device 300 of FIG. 3. The electronic device includes multiple antennas 904 while the cover 902 includes multiple bit conductors 906. The bit conductors 906 are patches of a conductive material that is embedded in the cover 902. The bit conductors 906 are positioned within the cover 902 such that when the cover 902 is close (and covers the display of the electronic device), the bit conductors 906 are positioned above the antennas. For example, a single bit conductor is positioned over one antenna.

The presence of a bit conductor that is positioned over a radar antenna is used to encode binary values, which is used to differentiate a screen cover from other surfaces. One bit of information can be encoded in the presence or absence of the bit conductor at an antenna location.

FIG. 9B illustrates example configurations of the bit conductor according to embodiments of this disclosure. The most distinctive bit conductor configuration can be used to detect whether the cover is positioned over the display screen of an electronic device. It is noted that FIG. 9B illustrates an example of four antennas and a possibility of up to four bit conductors. As such, there are four different bits with a possibility of 16 different configurations. FIG. 9B illustrates five of the sixteen configurations. It is noted that the presence of a bit conductor corresponds to a binary value of 1 while the absence of a bit conductor corresponds to a binary value of 0.

The configuration 910 illustrates a configuration where a bit conductor is present over all of the antennas. The corresponding code is 1111.

The configuration 912 illustrates a configuration where no bit conductors are present over any of the antennas. The corresponding code is 0000. The electronic device can determine based on the code 0000, that a cover is not positioned over the screen.

The configuration 914 illustrates a configuration where three bit conductors are present over three of the antennas. The corresponding code is 1110.

The configuration 916 illustrates a configuration where two bit conductors are present over two of the antennas. The corresponding code is 1100.

The configuration 918 illustrates a configuration where three bit conductors are present over three of the antennas. The corresponding code is 1011.

FIGS. 9C, 9D, 9E, 9F, and 9G illustrates an example simulation of comparing different bit conductor configurations according to embodiments of this disclosure. The simulation is based on a case where only one of the four antennas is a transmitter while the other three antennas act as a radar receiver.

Figure 9C:
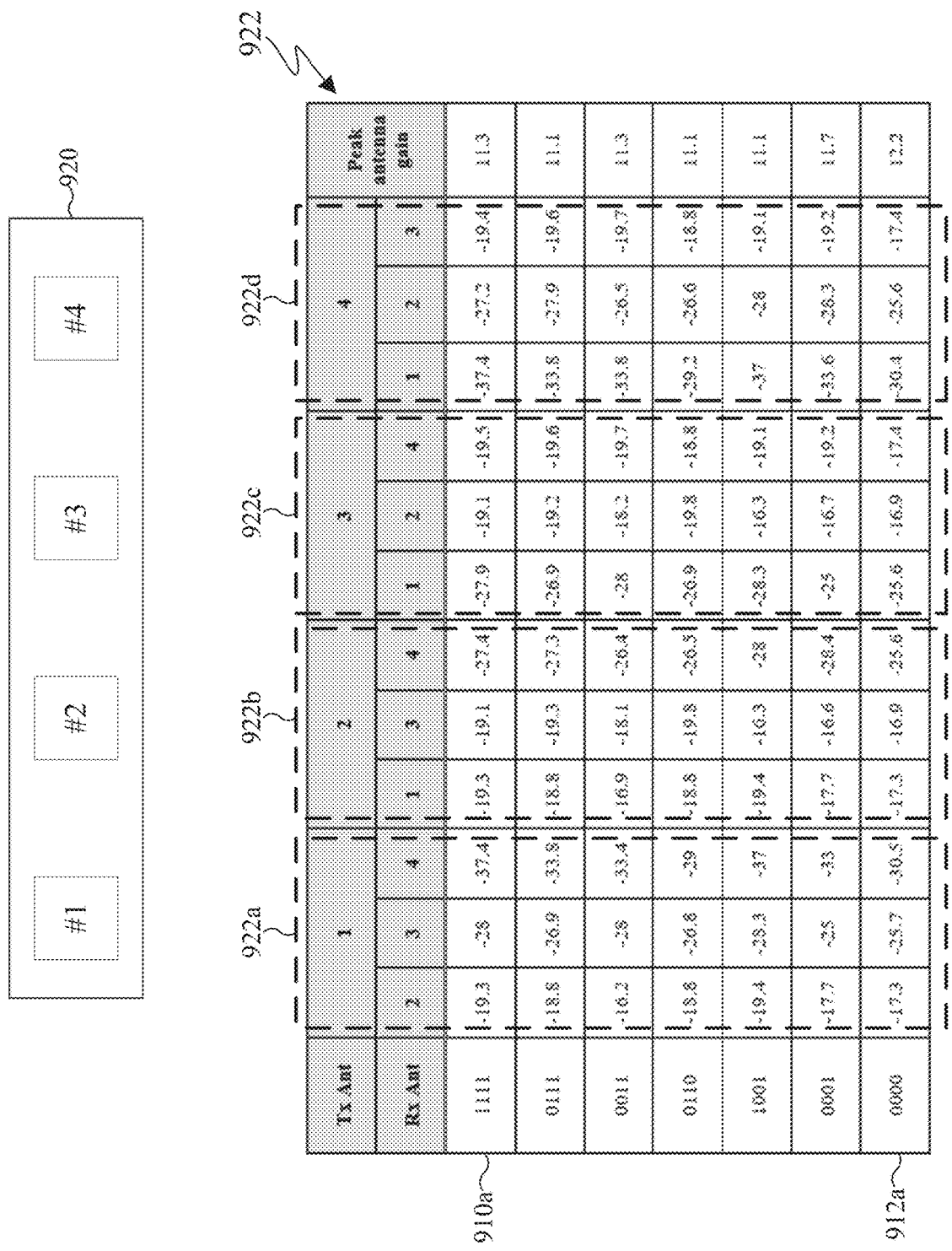
FIGS. 9C, 9D, 9E, 9F, and 9G illustrate an example simulation of comparing different bit conductor configurations according to embodiments of this disclosure.

The table 922 of FIG. 9C illustrates the simulation results of the received power [dB] for different bit configurations and all possible choices of the transmitting antennas. The table 922 illustrates seven different configurations of the bit conductors such as the configuration 910a and 912a. The configuration 910a corresponds to the configuration 910 of FIG. 9B and the configuration 912a corresponds to the configuration 912 of FIG. 9B.

For example, the block diagram 920 illustrates different antennas, such as antenna number 1, antenna number 2, antenna number 3, and antenna number 4. The table 922 includes four different groupings that describe the different powers when based on which of the four antennas is used as the transmitting antenna.

The grouping 922a of the table 922 describes using the antenna 1 as the transmitting antenna and the antenna numbers 2, 3, and 4 as the receiving antennas. The grouping 922*b* describes using the antenna 2 as the transmitting antenna and the antenna numbers 1, 3, and 4 as the receiving antennas. The grouping 922*c* describes using the antenna 3 as the transmitting antenna and the antenna numbers 1, 2, and 4 as the receiving antennas. The grouping 922*d* describes using the antenna 4 as the transmitting antenna and the antenna numbers 1, 2, and 3 as the receiving antennas.

A distance function can be defined, and pairwise distances for all possible pairs (covering all bit conductor configurations and choices of transmit antenna) is computed. Different criteria could be used for the selection of the configuration (including the choice of the transmit antenna). For example, for optimal differentiability (in terms of the defined distance), a criteria is to select the configuration whose closest configuration is the farthest. That is, the electronic device computes the distance from a point (the configuration candidate) to the all other points (all other configurations, except for itself), and then the selection procedure is to just select the one with the largest distance. Various choices for the distance function could be used. Some examples include the cosine distance, the Euclidean distance, or any L-p norm.

As shown in table 922, the detection of the cover uses just the received reflected power. If additional resources are used, rather than just the total received power (as described in table 922), frequency responses can be used which define the distance based on the frequency responses. FIGS. 9D, 9E, 9F, and 9G show several comparisons between bit conductor configuration 1111 against four other bit conductor configurations.

It is noted that even when the cover that includes the bit conductors is close, the bit conductors have little effect on the maximum gain of the antennas. As shown in table 922 even in the worse ones, the degradation (from when no bit conductor presence) is only around 1 dB. Therefore, even when the cover that includes the bit conductors is close, the transceiver (such as the transceiver 270 of FIG. 2) still functions with little degradation. That is, other radar detection and/or communications can function properly even when the cover is close.

Figure 9D:
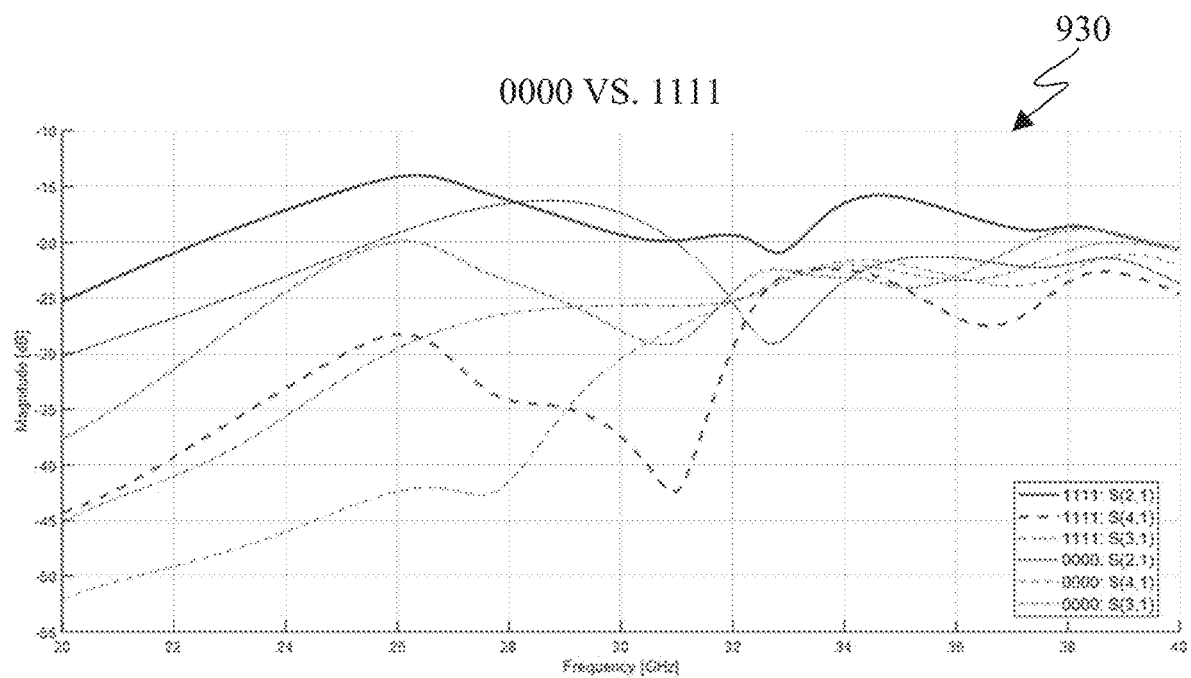

FIG. 9D illustrates a graph 930 comparing the bit conductor configuration of 1111 (configuration 910 of FIG. 9B) to the bit conductor configuration 0000 (configuration 912 of FIG. 9B). It is noted that antenna 1 block diagram 920 is selected as the transmitting antenna while antennas numbered 2, 3, and 4 are the receiving antennas.

Figure 9E:
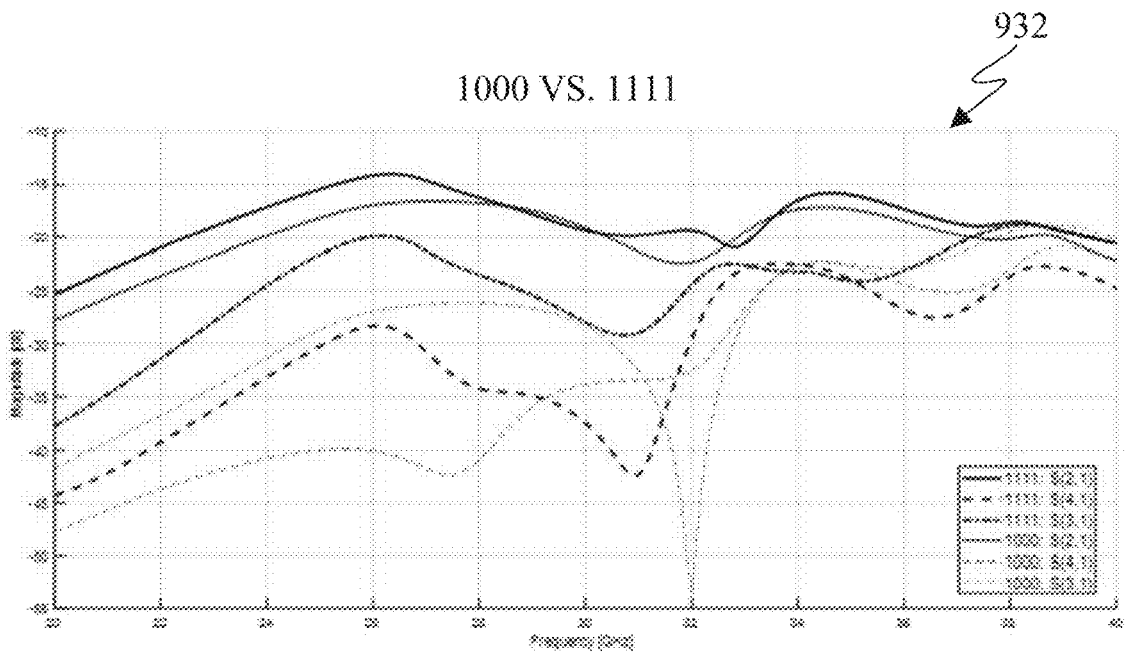

FIG. 9E illustrates a graph 932 comparing the bit conductor configuration of 1111 (configuration 910 of FIG. 9B) to the bit conductor configuration 1000. It is noted that antenna 1 block diagram 920 is selected as the transmitting antenna while antennas numbered 2, 3, and 4 are the receiving antennas.

Figure 9F:
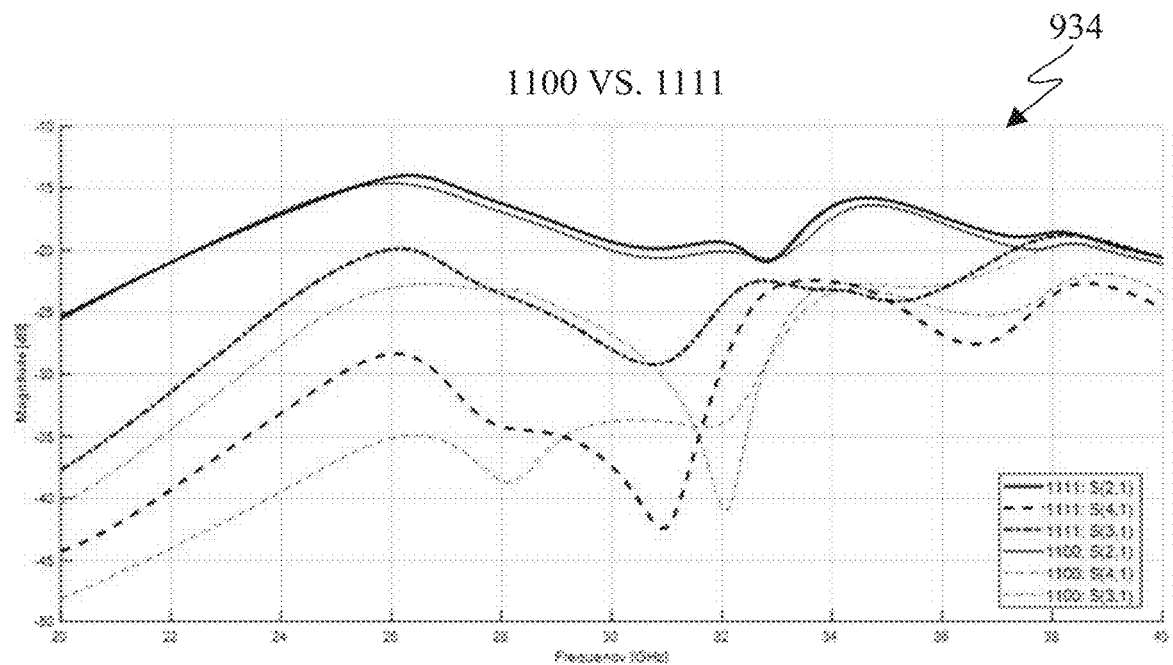

FIG. 9F illustrates a graph 934 comparing the bit conductor configuration of 1111 (configuration 910 of FIG. 9B) to the bit conductor configuration 1100 (configuration 916 of FIG. 9B). It is noted that antenna 1 block diagram 920 is selected as the transmitting antenna while antennas numbered 2, 3, and 4 are the receiving antennas.

Figure 9G:
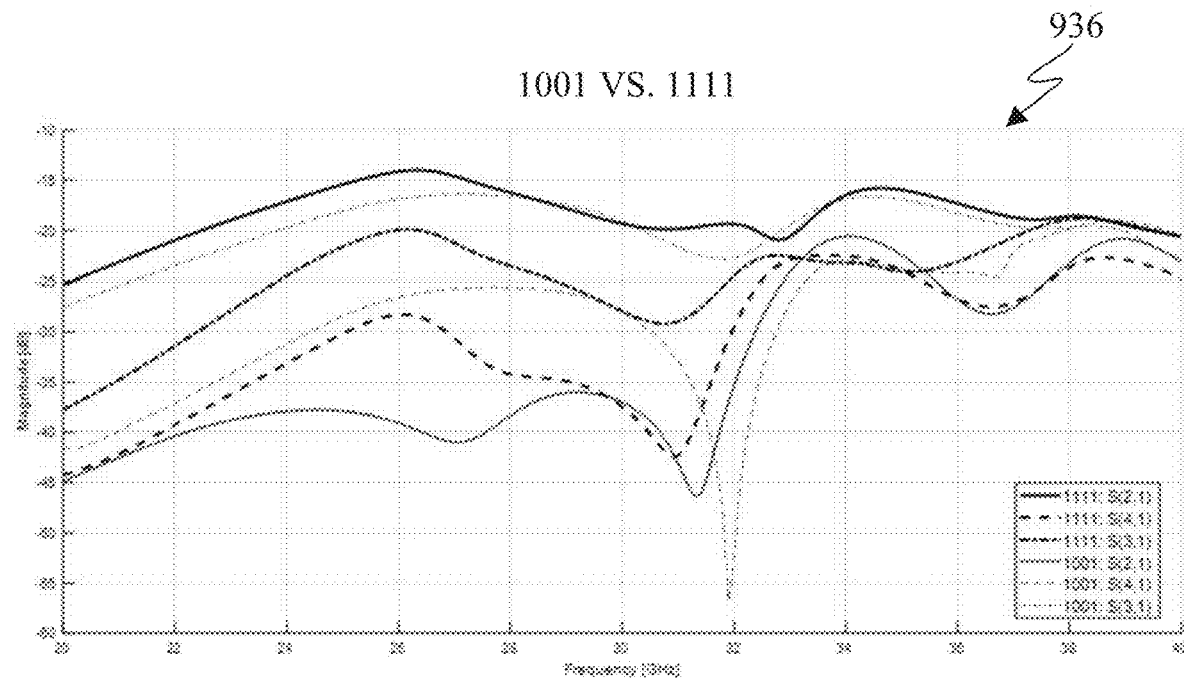

FIG. 9G illustrates a graph 936 comparing the bit conductor configuration of 1111 (configuration 910 of FIG. 9B) to the bit conductor configuration 1001. It is noted that antenna 1 block diagram 920 is selected as the transmitting antenna while antennas numbered 2, 3, and 4 are the receiving antennas.

The graphs 930, 932, 934, and 936 depict distinctive frequency response even with only one receive antenna. When using the frequency response, the distance can be defined on a larger vector space (when using the received powers, the space was three dimensional). The dimensions could depend on the bandwidth and the frequency resolution of the radar (which depend on the radar waveform configurations such as pulse duration and pulse repetition rate, and the like). Once the distance function is selected, the same procedure can be used to select the most distinctive configuration for optimal detection of the screen cover. It is noted that besides the choice of the transmit antennas and the bit conductor configurations, there is an extra degree of freedom in the choice of the radar transmission configurations.

Bit conductors, as described above, were used to detect the presence of a cover for an electronic device. However, bit conductors are not limited to simply detecting the presence of a cover for an electronic device. For example, bit conductors can be used to detect the folding state of a foldable device, such as an electronic device with a bendable display. For instance, by embedding the bit conductors on one side of the foldable device to match the antenna locations on the other side, the same principles as described above are applicable. By detecting the state when the chosen bit conductor configuration is present, it is possible to determine if the foldable device is in a fully close state.

Although FIGS. 9A-9G illustrates various aspects of bit conductors to identify whether a cover of an electronic device is closing, various changes may be made to the FIGS. 9A-9G. For example, the bit conductors can be embedded within an object and therefore not visible.

Figure 10A:
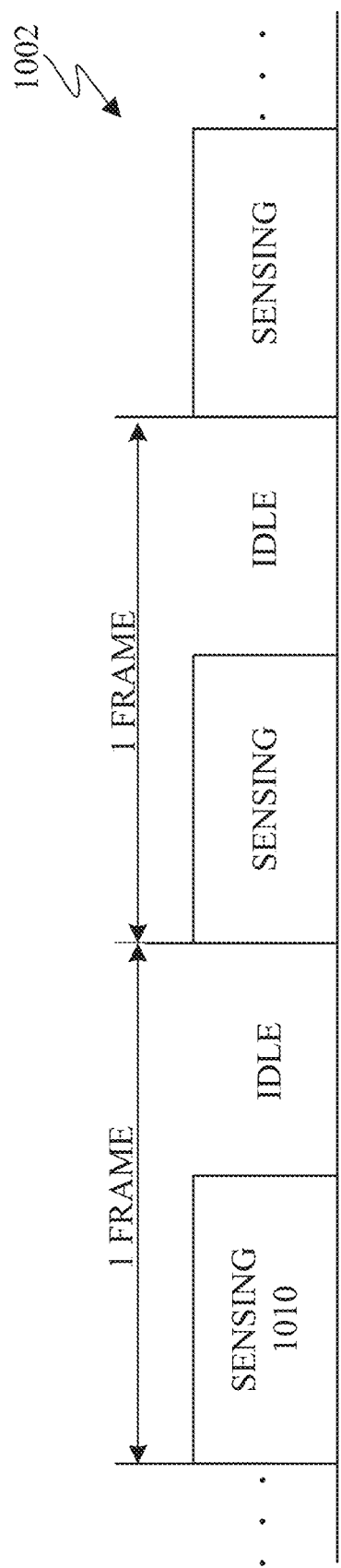
FIG. 10A describes an embodiment of when no explicit input is received as to when to start the reading according to embodiments of this disclosure.

FIG. 10A describes an embodiment of when no explicit input is received as to when to start the reading. Operating the radar can be user-initiated and non-user-initiated. The user-initiated category is where the user provides an input to the electronic device instructing the electronic device to start emitting radar signals. In this case, the radar may be turned off until the user explicitly starts the radar operation.

The non-user-initiated category is for applications such as the cover or the folding state detection. In this case, there is no explicit user input of when to start the reading, and thus the radar may need to be turned on. FIG. 10A describes the radar transceiver transmitting structure 1002.

The radar may transmit during the period denoted as sensing 1010, where during this sensing period, the radar may transmit one or multiple pulses (when using multiple antenna configurations). It is noted that this periodic transmission may have a low duty cycle because the number of pulses and the duration of the pulses may use small values. The reason is that by design the targets of the detection (either the pattern codes or the bit conductors) are made of reflective materials and thus signal response can be expected to be strong. Therefore, there is no need to do integration in time to boost the signal strength and thus one pulse could be enough for one antenna configuration. Also, the distance of the target can also be expected to be short, and thus again allows the use of short pulses.

For example, a radar reader operates at 10 Hz reading rate. If there are 32 antenna pairs and each pair transmits a pulse occupying 4 microseconds (the actual transmission time can be much shorter than this since this duration includes the silent period following the pulse transmission to receive the echo), then there is (32×4)/100000=0.128% duty cycle. If considering the bit conductor configuration with four antennas as shown in FIGS. 9A and 9B only three pulses are needed, since one of the antenna is the transmitter. As such in this example the duty cycle would be (3×4)/100000=0.012% duty cycle.

In certain embodiments, leveraging the radar ranging capability can yield better efficiency. For example, the radar may be configured to perform a full scan periodically, such as using a transmission frame structure as illustrated in FIG. 10A. In each scan, the radar reader collects a set of radar measurements and this set is processed to try to detect a valid pattern code. Leveraging the radar's ranging capability some processing power can be saved when trying to detect a valid pattern code.

Figure 10B:
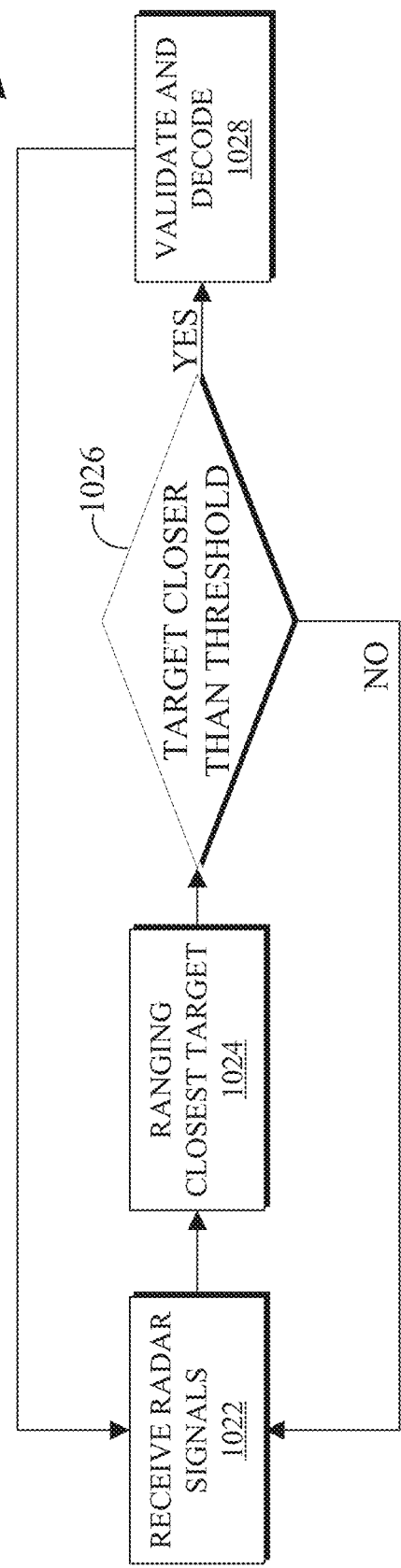
FIG. 10B illustrates a flowchart describing an overall flow for pattern code detection by leveraging the radar's ranging capability according to embodiments of this disclosure.

FIG. 10B illustrates a flowchart 1020 describing an overall flow for pattern code detection by leveraging the radar's ranging capability. For example, if the electronic device is expected to be able to read pattern codes up to 50 cm, then if detecting targets beyond 50 cm or no target detection at all, the processing effort to identify and decode a valid pattern code can be skipped. For another example, when using the pattern code for screen cover detection, some processing effort for the detection can be saved by using the ranging information to do the gating first. Again, in this case, we can expect the desired target to be in the proximity to the radar (the actual range will depend on the size of the device and the cover). Thus, only when a target closer than some threshold distance is detected, the procedure may invoke the processing routine for the screen cover detection.

As such, in step 1022 the electronic device receives radar signals. For example, the radar transceiver (such as the radar transceiver 270 of FIG. 2 and the transmitter 304 and receiver 306 of FIG. 3A) of an electronic device (such as the electronic device 200 of FIG. 2 or the electronic device 300 of FIG. 3) transmits radar signals towards a target object that includes the pattern code or a bit conductor, and receives reflected signals off of the target object. The step 1022 is similar to the step 410 of FIGS. 4A, 4B, 4C 4D, 4E, 4F, and 4H, the step 510 of FIGS. 5A, 5B, 5D, and 5E, the step 710 of FIGS. 7A, 7B, and 7C, and the step 810 of FIG. 8B.

In step 1024, the electronic device identifies the range (distance) to the closet object. In step 1026, the electronic device determines whether the distance to the closest object is within a threshold. When the distance to the closest object is not within the threshold, the process return to step 1022. When the distance to the closest object is within the threshold, then in step 1028, the electronic device validates and decodes the pattern code or the bit conductor.

Figure 11:
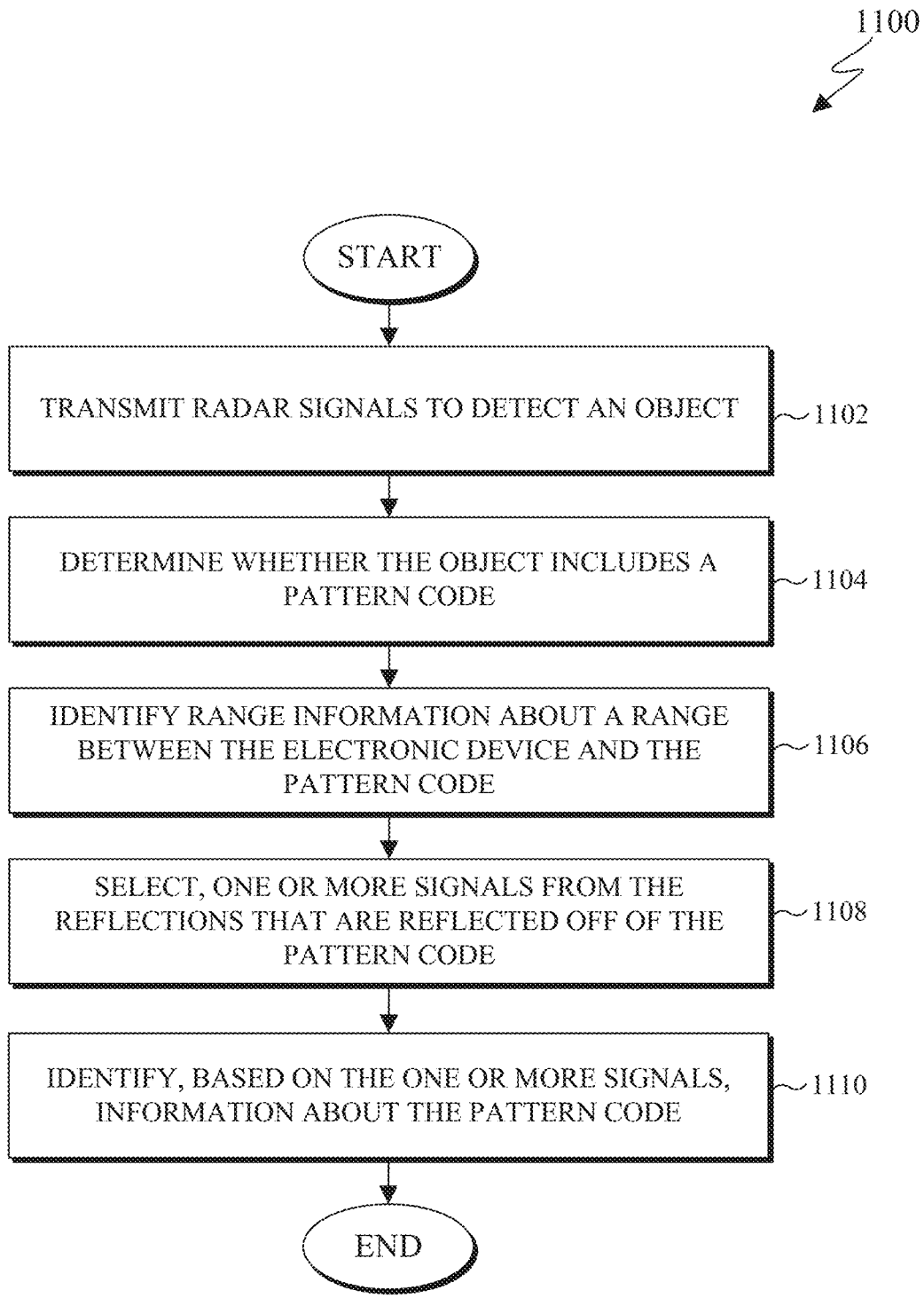
FIG. 11 illustrates an example flowchart for radar-based detection according to embodiments of this disclosure.

FIG. 11 illustrates an example flowchart 1100 for radar-based detection according to embodiments of this disclosure. The flowchart 1100 is described as implemented by the electronic device 200 of FIG. 2, the electronic device 300 of FIG. 3A, or any one of the client devices 106-114 of FIG. 1, and server 104 of FIG. 1. For ease of explanation the flowchart 1100 is described as being performed by the electronic device 200 of FIG. 2.

In step 1102, the electronic device 200 transmits radar signals to detect an object. The electronic device 200 emits radar signals and receives radar signals that reflected off of a target object via a radar transceiver, such as the radar transceiver 270 of FIG. 2.

In step 1104, the electronic device 200 determines whether the object includes a pattern code. For example, based on parameters of the received radar signals (such as power, frequency, the range, and the like) the electronic device determines whether the object includes a pattern code.

When the distance to the closest object, as indicated by the radar signals, is not within the threshold, the electronic device 200 determines that the object does not include a pattern code, a bit conductor, or the like. After determining that the object does not include a pattern code, a bit conductor, or the like the electronic device 200 identifies an environment around itself based on the reflections of the radar signal. The environment around the electronic device 200 can include determining whether the electronic device is being held by the user. The environment around the electronic device 200 can include determining whether the electronic device is located in a bag, a pocket, a drawer, on a surface such as a table, and the like.

For example, the electronic device 200 identifies the environment around itself by identifying leakage interference from the raw radar signals that are reflected off of the environment and received by the transceiver of the electronic device. The electronic device 200 then removes the leakage interference from the raw radar signals. After the leakage interference is removed from the raw radar signals, the electronic device 200 extracts a portion of the raw radar signals that correspond to a first delay tap based on different antenna configurations of the radar transceiver. The electronic device 200 then generates a beamforming image based on the portion of the raw radar signals. The electronic device 200 then classifies the environment around the electronic device based on the beamforming image. In certain embodiments, electronic device 200 is able to determine whether to reject the classified environment based on a comparison of a property of the raw radar signals that were used to classify the environment to a set of thresholds that are based on statistics from previous radar signals associated with the environment.

In certain embodiments, electronic device 200 can identify the environment around itself by using both radar data and sensor data. For example, the electronic device 200 uses sensors to receive sensor data. Based on the sensor data the electronic device 200 identifies a scenario or state of the electronic device 200, such as whether the electronic device is moving. Based on the scenario or state of the electronic device 200, the electronic device 200 can apply rules or a classifier to determine the environment around the electronic device.

A pattern code includes multiple strips. A portion of the strips are reflective while another portion of the strips are non-reflective (or less reflective). The strips can be in the same or different directions. The strips can have varying widths. Information can be identified from the pattern code based on at the widths of the reflective strips, or the widths of the non-reflective strips (corresponding to the spacing between the reflective strips), a direction of the strips, or a combination thereof.

In response to determining that the object includes a pattern code, in step 1106, the electronic device 200 identifies ranging information between the electronic device and the pattern code. The ranging information is about a range between the electronic device 200 and the pattern code. For example, when the distance to the closest object, as indicated by the radar signals, is not within the threshold, the electronic device 200 identifying leakage interference from the raw radar signals that are reflected off of the environment and received by the transceiver of the electronic device. The electronic device 200 then removes the leakage interference from the raw radar signals.

After the leakage interference is removed from the raw radar signals, the electronic device 200, in step 1108, selects one or more signals based on the range information. Based on the selected signals, the electronic device 200 estimates the widths of the reflective strips and the widths of the non-reflective strips. The electronic device 200 identifies the identity of the pattern code by decoding the pattern code based on the widths of the reflective and non-reflective strip. In step 1110, the electronic device 200 identifies identify information about the pattern code.

In certain embodiments, the electronic device 200 selects one or more signals based on the angle information that corresponds to the location of the pattern code. Based on the angle information, the electronic device 200 generates a 2D image by beam forming. Thereafter, in step 1110, the electronic device 200 classifies the 2D image in order to identify information from the pattern code.

In certain embodiments, the leakage is removed by leveraging the Doppler information. Rather, the electronic device 200 obtains Doppler information from the raw radar signals that are reflected off of the pattern code. The electronic device 200 then removes the component of the doppler that corresponds to no movement (which represents the leakage). The electronic device 200 then determines whether a cover is moving towards the electronic device 200 based on the remaining Doppler information.

In certain embodiments, the electronic device 200 identifies a pattern based on the location of bit conductors that are located over the antennas of the radar transceiver. For example, the pattern is based on a first portion the multiple antennas that are covered by the bit conductors and a second portion of the multiple antennas that are not covered by any of the bit conductors. Based on the pattern of which antennas are covered by a bit conductor the electronic device can identify information such as a particular device that is covering the antennas.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system. None of the description in this application should be read as implying that any particular element, step, or function is an essential element that must be included in the claims scope.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device for close-range detection, the electronic device comprising:
    a radar transceiver; and
    a processor operably connected to the radar transceiver, the processor configured to:
        transmit, via the radar transceiver, radar signals to detect an object,
        determine whether the object includes a repeating pattern of alternating reflective and non-reflective strips of varying widths along a single plane representing a pattern code based on reflections of the radar signals received by the radar transceiver,
        in response to a determination that the object includes the pattern code, identify range information about a range between the electronic device and the pattern code,
        select, based on the range information, one or more signals from the reflections of the radar signals that are reflected off of the pattern code, and
        identify, based on the one or more signals and a movement direction of the object relative to the electronic device, information about the pattern code.

2. The electronic device of claim 1, wherein:
    to determine that the object includes the pattern code, the processor is configured to identify, from the reflections of the radar signals that are reflected off of the pattern code, multiple strips including the reflective and the non-reflective strips, wherein a first portion of the multiple strips are a first level of reflectiveness and a second portion of the multiple strips are a second level of reflectiveness and a strip from the first portion of the multiple strips is adjacent to a strip of the second portion of the multiple strips; and
    the information is identified from the pattern code based on at least one of widths of the first portion of the multiple strips and widths of the second portion of the multiple strips.

3. The electronic device of claim 2, wherein to identify the information about the pattern code, the processor is further configured to:
    in response to transmission of the radar signals, receive raw radar signals;
    identify leakage interference from the raw radar signals;
    remove the leakage interference from the raw radar signals;
    after the leakage interference is removed from the raw radar signals, select the one or more signals from the raw radar signals, based on at least one of the range information and angle information corresponding to a location of the pattern code;
    estimate the widths of the first portion of the multiple strips and the widths of the second portion of the multiple strips; and
    decode the estimated widths of the first portion and the estimated widths of the second portion to identify an identity of the pattern code, wherein the information is identified based on the identity of the pattern code.

4. The electronic device of claim 1, wherein to identify the information about the pattern code, the processor is further configured to:
    in response to transmission of the radar signals, receive raw radar signals;
    identify leakage interference from the raw radar signals;
    remove the leakage interference from the raw radar signals;
    after the leakage interference is removed from the raw radar signals, select the one or more signals from the raw radar signals based on the range information;
    generate a two-dimensional image by beam forming based on the one or more signals; and
    classify the two-dimensional image to identify the information.

5. The electronic device of claim 1, wherein:
    the information indicates a status an external object with respect to the electronic device; and
    to identify the information about the pattern code, the processor is further configured to:
        in response to transmission of the radar signals, receive raw radar signals, over a period of time,
        obtain Doppler information from the raw radar signals,
        remove a component of the Doppler information that corresponds to static signals, and
        determine the status of the external object based on remaining components from the Doppler information.

6. The electronic device of claim 1, wherein:
the radar transceiver includes multiple antennas, and
to identify the information about the pattern code, the processor is further configured to:
- identify a pattern based on a position and a quantity of bit conductors that are positioned over the multiple antennas, wherein a first portion the multiple antennas are covered by the bit conductors respectively and a second portion of the multiple antennas that are not covered by any of the bit conductors, and
- identify the information based on the pattern.

7. The electronic device of claim 1, wherein:
in response to identifying the information about the pattern code, the processor is configured to:
- determine, based on the information, that the object is a cover for the electronic device,
- determine, based on the range information, whether the cover is moving towards the electronic device, and
- upon a determination that the cover is moving towards the electronic device, cancel leakage based on movement of the cover; and
when the radar signals do not indicate that the object that includes the pattern code, the processor is further configured to identify an environment around the electronic device from the reflections of the radar signals.

8. The electronic device of claim 7, wherein the processor is configured to:
- in response to transmission of the radar signals, receive raw radar signals;
- identify leakage interference from the raw radar signals;
- remove the leakage interference from the raw radar signals;
- after the leakage interference is removed from the raw radar signals, extract a portion of the raw radar signals that correspond to a first delay tap based on different antenna configurations of the radar transceiver;
- generate a beamforming image based on the portion of the raw radar signals; and
- classify the environment around the electronic device based on the beamforming image.

9. The electronic device of claim 8, wherein the processor is configured to determine whether to reject the classified environment based on a comparison of a property of the raw radar signals that were used to classify the environment to a set of thresholds that are based on statistics from previous radar signals associated with the environment.

10. The electronic device of claim 1, wherein:
the electronic device further includes a sensor; and
when the radar signals do not detect the object that includes the pattern code, the processor is further configured to:
- receive sensor data from the sensor, and
- identify an environment around the electronic device from the reflections of the radar signals and the sensor data.

11. A method for close-range detection, the method comprising:
- transmitting, via a radar transceiver of an electronic device, radar signals to detect an object;
- determining whether the object includes a pattern code based on reflections of the radar signals received by the radar transceiver;
- in response to determining that the object includes a repeating pattern of alternating reflective and non-reflective strips of varying widths along a single plane representing the pattern code, identify range information about a range between the electronic device and the pattern code;
- selecting, based on the range information, one or more signals from the reflections of the radar signals that are reflected off of the pattern code; and
- identifying, based on the one or more signals and a movement direction of the object relative to the electronic device, information about the pattern code.

12. The method of claim 11, further comprising:
identifying, from the reflections of the radar signals that are reflected off of the pattern code, multiple strips including the reflective and the non-reflective strips, wherein a first portion of the multiple strips are a first level of reflectiveness and a second portion of the multiple strips are a second level of reflectiveness and a strip from the first portion of the multiple strips is adjacent to a strip of the second portion of the multiple strips,
wherein the information is identified from the pattern code based on at least one of widths of the first portion of the multiple strips and widths of the second portion of the multiple strips.

13. The method of claim 12, wherein identifying the information about the pattern code comprises:
- in response to transmission of the radar signals, receiving raw radar signals;
- identifying leakage interference from the raw radar signals;
- removing the leakage interference from the raw radar signals;
- after the leakage interference is removed from the raw radar signals, selecting the one or more signals from the raw radar signals, based on at least one of the range information and angle information corresponding to a location of the pattern code;
- estimating the widths of the first portion of the multiple strips and the widths of the second portion of the multiple strips; and
- decoding the estimated widths of the first portion and the estimated widths of the second portion to identify an identity of the pattern code, wherein the information is identified based on the identity of the pattern code.

14. The method of claim 11, wherein identifying the information about the pattern code comprises:
- in response to transmission of the radar signals, receiving raw radar signals;
- identifying leakage interference from the raw radar signals;
- removing the leakage interference from the raw radar signals;
- after the leakage interference is removed from the raw radar signals, selecting the one or more signals from the raw radar signals based on the range information;
- generating a two-dimensional image by beam forming based on the one or more signals; and
- classifying the two-dimensional image to identify the information.

15. The method of claim 11, wherein:
the information indicates a status an external object with respect to the electronic device; and
identifying the information about the pattern code comprises:
- in response to transmission of the radar signals, receiving raw radar signals, over a period of time,
- obtaining Doppler information from the raw radar signals, removing a component of the Doppler information that corresponds to static signals, and determining the status of the external object based on remaining components from the Doppler information.

16. The method of claim 11, wherein identifying the information about the pattern code comprises:

identifying a pattern based on a position and a quantity of bit conductors that are positioned over multiple antennas of the radar transceiver, wherein a first portion the multiple antennas are covered by the bit conductors respectively and a second portion of the multiple antennas that are not covered by any of the bit conductors, and identifying the information based on the pattern.

17. The method of claim 11, wherein:

in response to identifying the information about the pattern code, the method comprises:

determining, based on the information, that the object is a cover for the electronic device determining, based on the range information, whether the cover is moving towards the electronic device, and upon a determination the cover is moving towards the electronic device, canceling leakage based on movement of the cover; and the method further comprising identifying an environment around the electronic device from the reflections of the radar signals, when the radar signals do not indicate that the object that includes the pattern code.

18. The method of claim 17, further comprising:

in response to transmission of the radar signals, receiving raw radar signals;

identifying leakage interference from the raw radar signals;

removing the leakage interference from the raw radar signals;

after the leakage interference is removed from the raw radar signals, extracting a portion of the raw radar signals that correspond to a first delay tap delay based on different antenna configurations of the radar transceiver;

generating a beamforming image based on the portion of the raw radar signals; and classifying the environment around the electronic device based on the beamforming image.

19. The method of claim 18, further comprising determining whether to reject the classified environment based on a comparison of a property of the raw radar signals that were used to classify the environment to a set of thresholds that are based on statistics from previous radar signals associated with the environment.

20. The method of claim 11, further comprising:

receiving data from a sensor; and identifying an environment around the electronic device from the reflections of the radar signals and the data, when the radar signals do not detect the object that includes the pattern code.

* * * * *